United States Patent
Morita et al.

(10) Patent No.: US 9,524,055 B2
(45) Date of Patent: Dec. 20, 2016

(54) DISPLAY DEVICE DETECTING TOUCH ON DISPLAY UNIT

(71) Applicant: Konica Minolta, Inc., Chiyoda-ku (JP)

(72) Inventors: Mitsutaka Morita, Hachioji (JP); Yoichi Kurumasa, Toyokawa (JP); Yoshiyuki Tamai, Toyohashi (JP); Mie Kawabata, Toyokawa (JP); Ryosuke Nishimura, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/306,737

(22) Filed: Jun. 17, 2014

(65) Prior Publication Data
US 2014/0368454 A1    Dec. 18, 2014

(30) Foreign Application Priority Data
Jun. 18, 2013    (JP) .................................. 2013-127165

(51) Int. Cl.
G06F 3/041    (2006.01)
G06F 3/0488    (2013.01)

(52) U.S. Cl.
CPC ........... *G06F 3/0418* (2013.01); *G06F 3/0416* (2013.01); *G06F 3/0488* (2013.01); *G06F 2203/04104* (2013.01)

(58) Field of Classification Search
None
See application file for complete search history.

(56) References Cited

U.S. PATENT DOCUMENTS

| | | | |
|---|---|---|---|
| 2006/0152497 A1 | 7/2006 | Rekimoto | |
| 2009/0251434 A1* | 10/2009 | Rimon | G06F 1/30 345/173 |
| 2011/0022982 A1 | 1/2011 | Takaoka et al. | |
| 2011/0187651 A1* | 8/2011 | Whitlow | G06F 3/041 345/173 |
| 2011/0242022 A1 | 10/2011 | Wen | |

(Continued)

FOREIGN PATENT DOCUMENTS

| | | |
|---|---|---|
| CN | 102214031 A | 10/2011 |
| JP | 07-028791 | 1/1995 |

(Continued)

OTHER PUBLICATIONS

Notice of Allowance issued in corresponding Japanese Patent Application No. 2013-127165; mailed on May 19, 2015, and English translation thereof. (5 pages).

(Continued)

*Primary Examiner* — Seokyun Moon
(74) *Attorney, Agent, or Firm* — Buchanan Ingersoll & Rooney PC

(57) ABSTRACT

An MFP (Multi Function Peripheral) serving as a display device detects a touch on the touch panel and then sets a wait time in accordance with the position of the touch on the touch panel. If another touch is detected before the wait time has passed since the touch on the touch panel is detected, the MFP determines that the detected two touches are multi-touch. If the wait time has passed without detecting another touch since the touch on the touch panel is detected, the MFP determines that the detected touch is single touch.

18 Claims, 31 Drawing Sheets

(56) References Cited

U.S. PATENT DOCUMENTS

2013/0033448 A1    2/2013  Yano et al.
2013/0234982 A1*  9/2013  Kang .............................. 345/174
2013/0300710 A1*  11/2013  Cho et al. ..................... 345/174
2014/0176470 A1*  6/2014  Huang .......................... 345/173

FOREIGN PATENT DOCUMENTS

| JP | 2002-311820 | 10/2002 |
| JP | 2007-207275 A | 8/2007 |
| JP | 2011-028534 | 2/2011 |
| JP | 2011-070250 A | 4/2011 |
| JP | 2011-234008 | 11/2011 |
| JP | 2013-025621 A | 2/2013 |

OTHER PUBLICATIONS

Office Action (First Office Action) issued on Sep. 28, 2016, by the State Intellectual Property Office of the People's Republic of China in corresponding Chinese Patent Application No. 201410270077.0 and English translation of the Office Action. (15 pages).

* cited by examiner

FIG.11
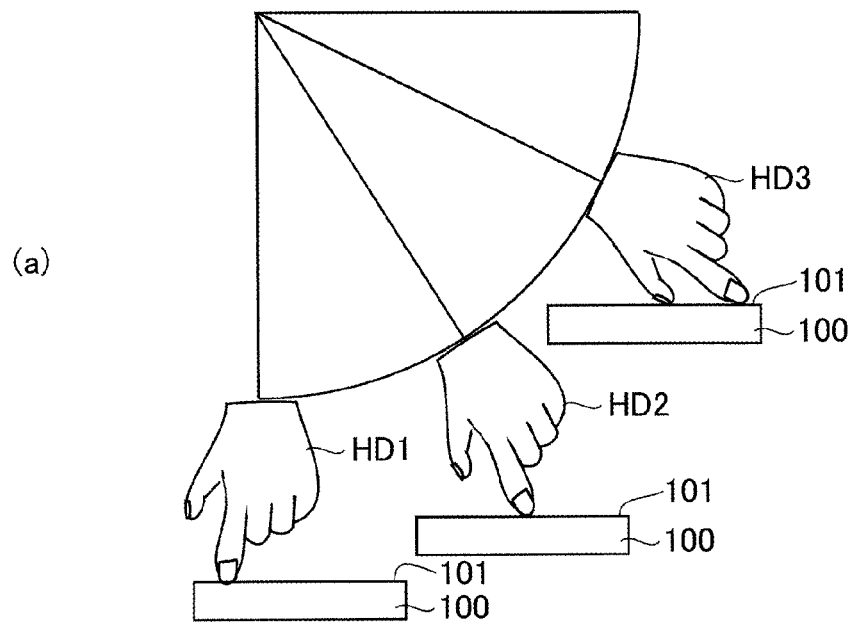
(a)
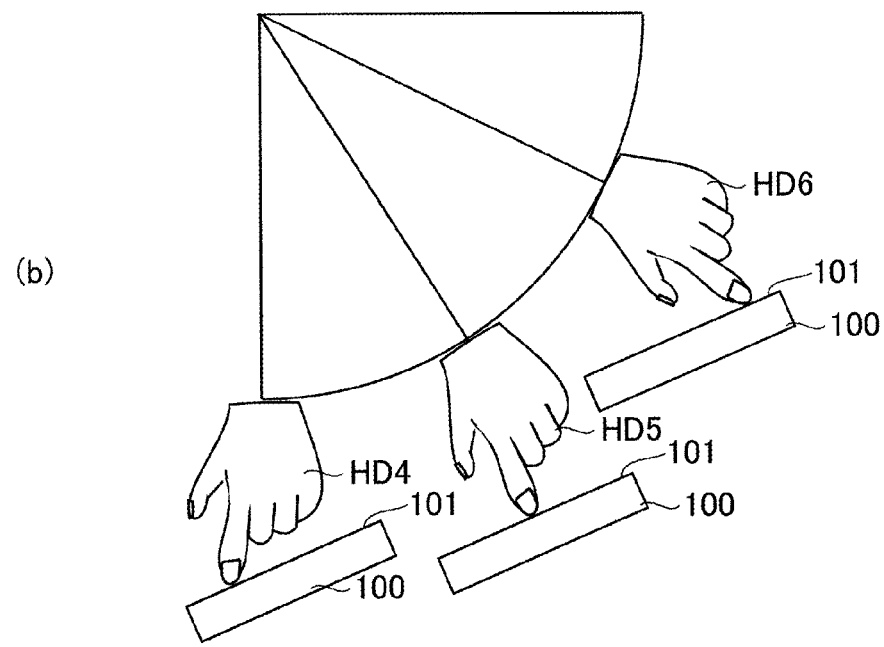
(b)

FIG.16

USER INFORMATION DATABASE

| USER NAME | PASSWORD | HEIGHT | DOMINANT HAND |
|---|---|---|---|
| A | wu1ix9 | 148 | RIGHT |
| B | kn2189 | 175 | RIGHT |
| C | 5sio7w | 163 | LEFT |
| D | uiod9p | 170 | RIGHT |
| E | 0sujwo | 185 | RIGHT |
| F | 2djio3 | 143 | LEFT |

FIG.30

TABLE FOR SETTING ENVIRONMENT-CONSIDERED TIME

| ANGLE θ \ HEIGHT OF USER | ~140cm | 140cm ~160cm | 160cm ~180cm | 180cm~ |
|---|---|---|---|---|
| 0~25degs. | 0 | 50ms | 100ms | 150ms |
| 25degs.~45degs. | 50ms | 100ms | 150ms | 200ms |
| 45degs.~75degs. | 100ms | 150ms | 200ms | 250ms |
| 75degs.~90degs. | 150ms | 200ms | 250ms | 300ms |

DISPLAY DEVICE DETECTING TOUCH ON DISPLAY UNIT

This application is based on Japanese Patent Application No. 2013-127165 filed with the Japan Patent Office on Jun. 18, 2013, the entire content of which is hereby incorporated by reference.

BACKGROUND OF THE INVENTION

Field of the Invention

The present invention relates to a display device, and more particularly to a display device capable of appropriately detecting a touch operation by a user.

Description of the Background Art

General image forming apparatuses such as MFPs (Multi Function Peripherals) are provided with operation panels. An operation panel includes a touch panel which displays software keys and a variety of information for accepting operations through the user's operating finger, and hardware keys provided around the periphery of the display. An image forming apparatus accepts a touch from a user on a software key appearing on the touch panel to execute a process allocated to the key. The touch panel allows the user to perform an operation by directly touching a display screen appearing on the touch panel, thereby enabling an intuitive operation and achieving high operability.

The operation panel of a multi-function image forming apparatus, typically, such as an MFP, has a display configuration in which a preview image and a number of software keys are fitted in a single screen on the operation panel. The operation panel therefore tends to display software keys and characters on the keys in a reduced size. Most of operation panels therefore are provided with a screen zoom function for enlarging a screen.

The touch panel technology has recently evolved with proliferation of smart phones, tablet terminals, and other devices, and touch panels are capable of multi-touch. Multi-touch refers to an operation of simultaneously touching a plurality of points on a touch panel. Examples of multi-touch include pinch gestures. Examples of the pinch gestures include pinch-out in which two closed fingers are opened, and pinch-in in which opened fingers are closed.

Document 1 discloses an information processing apparatus in which a screen in an enlarged or reduced size appears when a pinch gesture is accepted. The information processing apparatus includes a touch position detection unit and a display unit. When touches at any two positions are detected simultaneously, the touch position detection unit additionally detects a change in the distance between touch-detected positions. The display unit enlarges the size of information appearing on the display unit in accordance with the amount of increase in the distance between the touch-detected positions and reduces the size of information appearing on the display unit in accordance with the amount of decrease in the distance between the touch-detected positions. This information processing apparatus allows the user to enlarge or reduce a screen on the operation panel through such an intuitive operation as a pinch gesture.

To perform a pinch gesture on a touch panel, a user starts a pinch gesture by simultaneously touching any two points on the touch panel with two fingers. It is, however, difficult to simultaneously touch the touch panel with two fingers. For example, the difference in length between two fingers, the angle or height of the touch panel, the user's dominant hand or manner of motion of fingers, or other factors may cause a subtle time lag in touch timing although the user intended simultaneous touch with two fingers. The information processing apparatus according to Document 1 below may erroneously determine that a touch by one of the user's two fingers touching the touch panel that comes into contact first is single touch although the user intended to perform a pinch gesture.

FIG. 31 is a diagram illustrating a touch determination method in a conventional information processing apparatus. It is noted that in FIG. 4, FIG. 6, FIG. 8, FIG. 12, FIG. 14, FIG. 15, FIG. 23, and FIG. 31 the touch positions on the touch panel are hatched.

Referring to FIG. 31, assume that the user of the information processing apparatus makes a first touch at a position P101 on the touch panel and makes a second touch at a position P102 on the touch panel slightly later than the first touch thereby to perform multi-touch on the touch panel. In this case, the information processing apparatus may erroneously determine that the touch at position P101 is single touch and perform a process that would be performed when a key KY100 at position P101 was pressed, and may ignore the second touch.

Document 2 below discloses a technique that can prevent an erroneous determination that a pinch gesture is single touch. This touch operation device counts the number of touch points including the initial touch point that are sensed by the touch panel within a predetermined measurement time from the start of the initial touch, and determines that the counted number is the collective number of touch points.

[Document 1] Japanese Laid-Open Patent Publication No. 2007-207275 (U.S. Pat. No. 4,412,348)

[Document 2] Japanese Laid-Open Patent Publication No. 2011-70250

With the touch operation device in Document 2, it is difficult to set a length of the measurement time. Specifically, the number of touch points cannot be finalized unless a predetermined measurement time has passed since the start of touch at the first touch point, so that the responsiveness is reduced when the measurement time is long. The accuracy of detection of touch points is reduced when the measurement time is short.

These problems are not unique to operation panels and may generally occur in display devices including portable terminals. In a portable terminal, when a pinch gesture is accepted on a browser screen, the browser screen is enlarged or reduced, and when selection of a link is accepted through single touch (single tap), the screen makes a transition to the link. The information terminal thus may erroneously determine that a first touch of multi-touch is single touch. Presumably, some information terminals that detect a touch based on off-edge (a change from a state in which the display is touched to a state in which the display is not touched) do not have such a problem.

SUMMARY OF THE INVENTION

An object of the present invention is to provide a display device capable of appropriately detecting a touch operation by a user.

A display device according to an aspect of the present invention includes a first touch detection unit that detects a touch on a display unit, a setting unit that sets a wait time in accordance with a position of the touch detected by the first touch detection unit, a second touch detection unit that detects a touch on the display unit after the first touch detection unit detects a touch, a multi-touch determination unit that, if the second touch detection unit detects a touch before the wait time has passed since the first touch detection unit detects a touch, determines that the touches detected by the first and second touch detection units are multi-touch, and a single-touch determination unit that, if the wait time has passed without the second touch detection unit detecting a touch since the first touch detection unit detects a touch, determines that the touch detected by the first touch detection unit is single touch.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a diagram schematically showing a positional relationship between the user's hand and operation panel 100.

FIG. 16 is a diagram schematically showing a user information database.

FIG. 30 is a diagram schematically showing a table for setting an environment-considered time.

DESCRIPTION OF THE PREFERRED EMBODIMENTS

Embodiments of the present invention will be described below with reference to the figures.

In the following embodiment, the display device is an MFP, by way of example. However, the display device may be an image forming apparatus other than an MFP, such as a facsimile machine, a copier, or a printer. The display device may be a device other than an image forming apparatus, for example, a tablet, a PC (Personal Computer) or a mobile phone.

[Configuration of Display Device]

First, a configuration of the display device in the present embodiment will be described.

Figure 1:
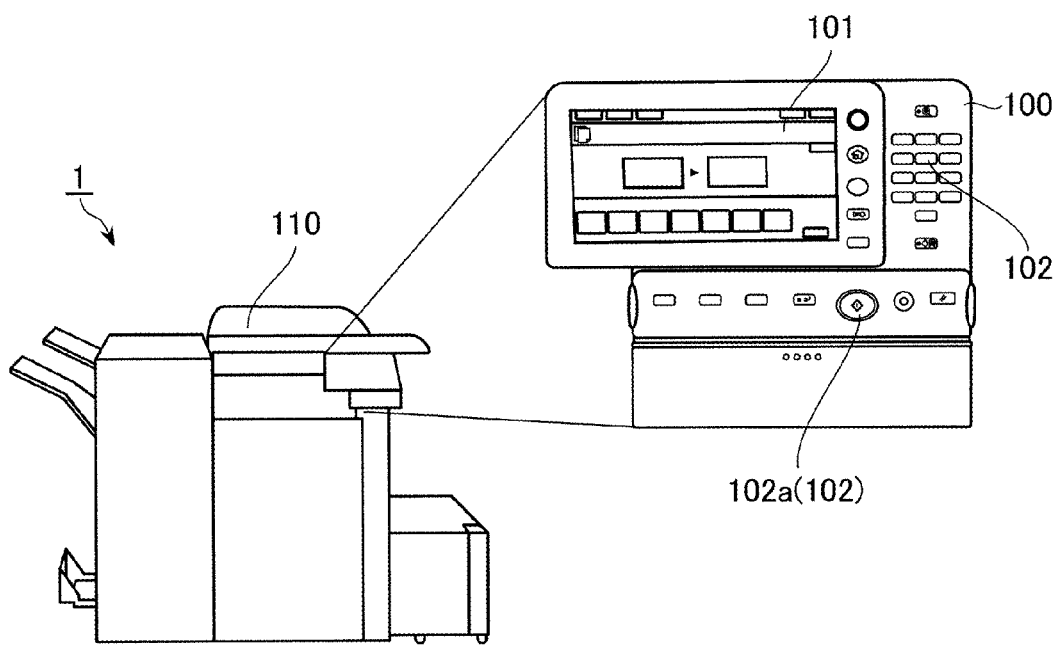
FIG. 1 schematically shows an external view of MFP 1 in an embodiment of the present invention.

FIG. 1 schematically shows an external view of an MFP 1 in an embodiment of the present invention. FIG. 1 shows operation panel 100 of MFP 1 in an enlarged view.

Referring to FIG. 1, MFP 1 (an example of the display device) includes an operation panel 100 and a scanner 110. Operation panel 100 is provided on the front surface of MFP 1, and scanner 110 is provided on the top of MFP 1. Operation panel 100 includes a touch panel 101 (an example of the display unit) and a plurality of hardware keys 102 including a start key 102a for giving an instruction to execute a job. MFP 1 performs a variety of processes based on a touch on touch panel 101 or a press on hardware key 102, accepted from the user. The scanner scans a document image.

Figure 2:
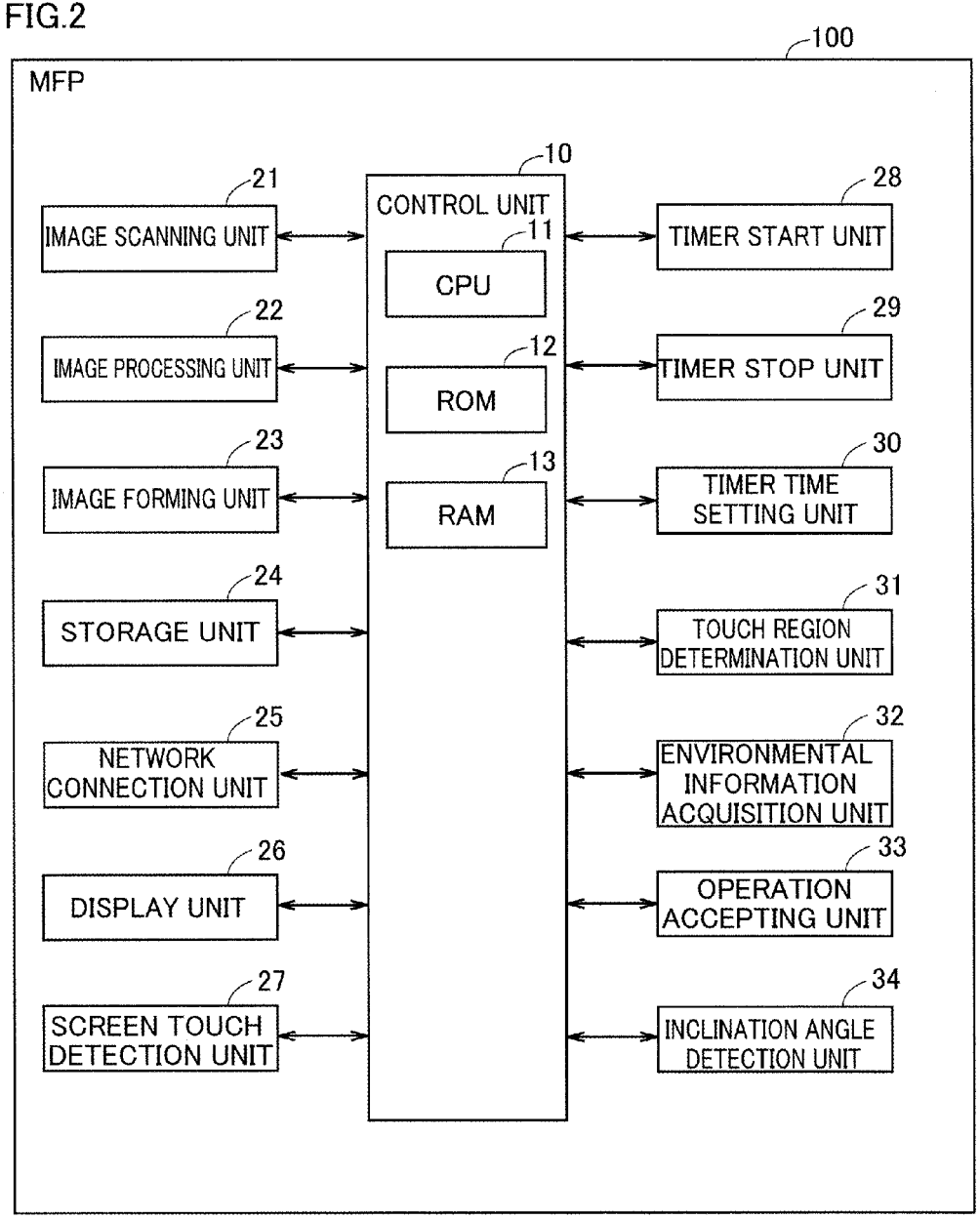
FIG. 2 is a block diagram showing a configuration of MFP 1 in an embodiment of the present invention.

FIG. 2 is a block diagram showing a configuration of MFP 1 in an embodiment of the present invention.

Referring to FIG. 2, MFP 1 includes a control unit 10, an image scanning unit 21, an image processing unit 22, an image forming unit 23, a storage unit 24, a network connection unit 25, a display unit 26, a screen touch detection unit 27, a timer start unit 28, a timer stop unit 29, a timer time setting unit 30, a touch region determination unit 31, an environmental information acquisition unit 32, an operation accepting unit 33, and an inclination angle detection unit 34. Control unit 10, image scanning unit 21, image processing unit 22, image forming unit 23, storage unit 24, network connection unit 25, display unit 26, screen touch detection unit 27, timer start unit 28, timer stop unit 29, timer time setting unit 30, touch region determination unit 31, environmental information acquisition unit 32, operation accepting unit 33, and inclination angle detection unit 34 are connected with each other.

Control unit 10 centrally controls the operation of each unit of MFP 1. Control unit 10 includes a CPU (Central Processing Unit) 11, a ROM (Read Only Memory) 12, and a RAM (Random Access Memory) 13. CPU 11 reads a necessary program from ROM 12 and performs central control on MFP 1 in accordance with the program. ROM 12 stores a variety of programs. RAM 13 is a work area for CPU 11.

Image scanning unit 21 scans a document image using scanner 110.

When a print execution instruction is accepted from operation panel 100, an external device connected to MFP 1, or other units, image processing unit 22 creates print data of an image to be printed based on the execution instruction. Image processing unit 22 also creates data of a screen to be displayed on touch panel 101.

Image forming unit 23 forms an image on a recording medium (for example, paper) based on the print data created by image processing unit 22. Image forming unit 23 mainly includes a toner image forming unit, a fixing device, and a paper conveyor. Image forming unit 23 forms an image on paper, for example, by electrophotography. The toner image forming unit combines images of four colors in tandem and forms a color image on paper. The toner image forming unit includes photoconductors provided for colors including C (cyan), M (magenta), Y (yellow), and K (black), an intermediate transfer belt onto which toner images are transferred from the photoconductors (primary transfer), and a transfer unit for transferring an image from the intermediate transfer belt onto paper (secondary transfer). The fixing device has a heating roller and a pressing roller. The fixing device conveys paper having a toner image thereon between the heating roller and the pressing roller, and heats and presses the paper. The fixing device then fuses and fixes toner on the paper thereby forming an image on paper. The paper conveyor mainly includes a paper feed roller, a conveyance roller, and a motor for driving them. The paper conveyor feeds paper from a paper feed cassette and conveys paper in the inside of the casing of MFP 1. The paper conveyor ejects paper having an image formed thereon from the casing of MFP 1 to, for example, an output tray.

Storage unit 24 is, for example, an HDD (Hard Disk Drive) to store a variety of information.

Network connection unit 25 transmits/receives data to/from an external device through a network (not shown).

Display unit 26 displays a variety of information on touch panel 101.

Screen touch detection unit 27 detects a touch on touch panel 101 based on on-edge, which is a change from a state in which touch panel 101 is not touched to a state in which touch panel 101 is touched. Screen touch detection unit 27 also detects the coordinates of a touch on touch panel 101.

Timer start unit 28 starts the timer for measuring a wait time when a touch is detected by screen touch detection unit 27.

Timer stop unit 29 stops the timer for measuring a wait time in a predetermined case.

Timer time setting unit 30 sets a wait time to be measured by the timer, based on a region determined by touch region determination unit 31 and information acquired by environmental information acquisition unit 32.

Touch region determination unit 31 determines which region in the display screen on touch panel 101 the position of the touch detected by screen touch detection unit 27 belongs to.

Environmental information acquisition unit 32 obtains information of the use environment of the operation panel, such as the angle of the panel, the dominant hand of the user, and the height of the user.

Operation accepting unit 33 accepts an operation through a press on hardware key 102. Operation accepting unit 33 specifies an operation performed on touch panel 101 based on the coordinates of a touch on touch panel 101.

Inclination angle detection unit 34 detects the angle of the display surface of touch panel 101 relative to the horizontal plane.

[Basic Operation of Display Device]

The basic operation of the display device will now be described.

The user who operates operation panel 100 performs multi-touch on touch panel 101 as necessary. The user generally performs multi-touch with the index finger (or the middle finger) and the thumb. For example, to enlarge a screen, the user performs pinch-out of touching the screen with the two fingers and then moving the fingers apart.

When a touch is detected, MFP 1 determines whether the touch is single touch or a first touch of multi-touch. If a touch on touch panel 101 is detected, MFP 1 sets a wait time in accordance with the position of the detected touch. If another touch is detected on touch panel 101 before the set wait time has passed since a touch is detected, MFP 1 determines that the detected two touches are multi-touch. If the set wait time has passed without detecting another touch on touch panel 101 since a touch is detected on touch panel 101, MFP 1 determines that the touch detected on touch panel 101 is single touch.

Figure 3:
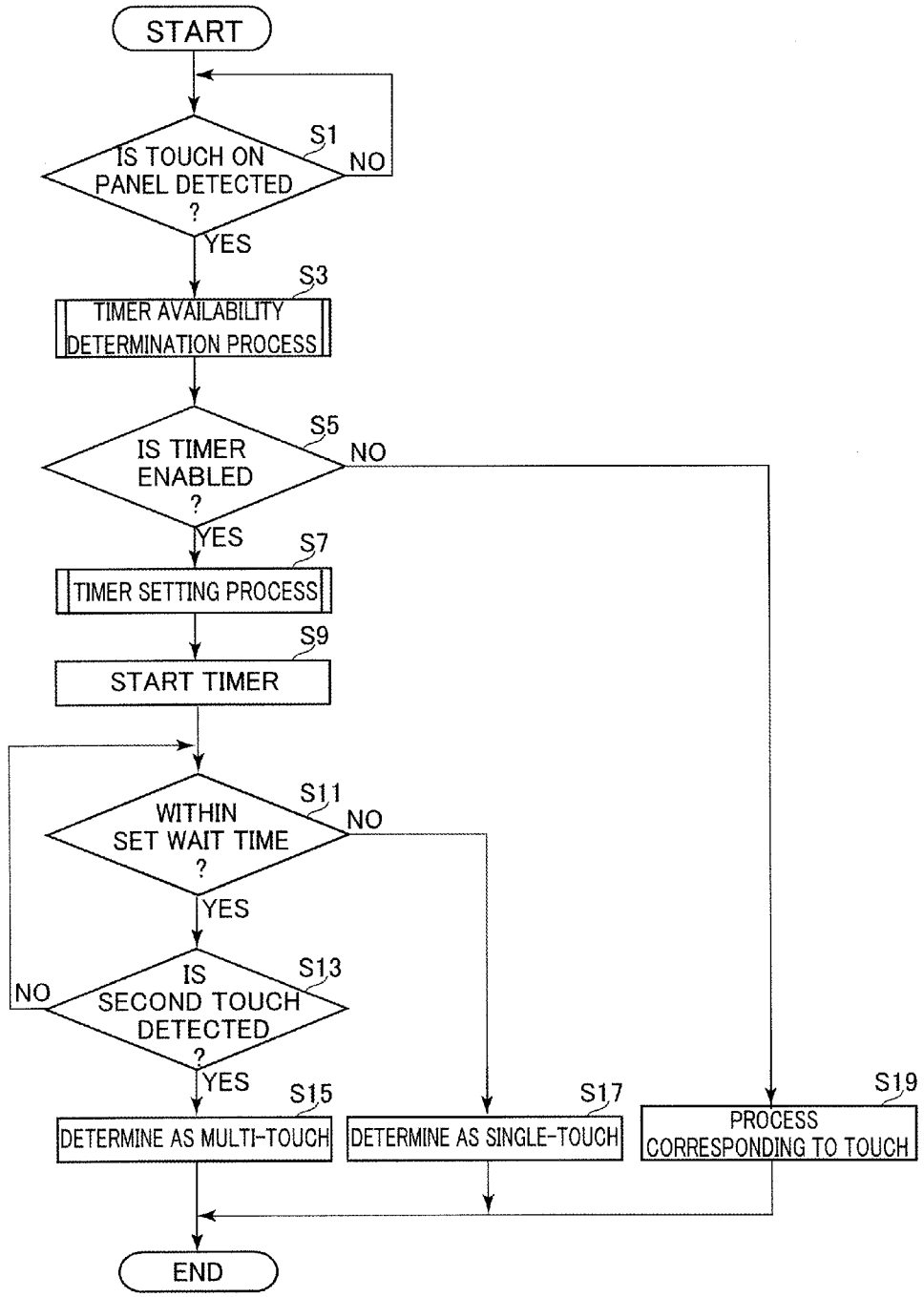
FIG. 3 is a flowchart showing operation of MFP 1 in an embodiment of the present invention.

FIG. 3 is a flowchart showing operation of MFP 1 in an embodiment of the present invention.

Referring to FIG. 3, control unit 10 of MFP 1 performs a timer availability determination process (S3) when a first touch on touch panel 101 is detected (S1). The timer availability determination process, which will be detailed later, is a process of determining to start the timer for measuring the wait time (the timer is enabled) or not to start the timer (the timer is disabled). Control unit 10 then determines whether the timer is enabled (S5).

In step S5, if it is determined that the timer is disabled (NO in S5), control unit 10 performs a process corresponding to the touch (S19). The process then ends. For example, when a touch is on a position where a key is displayed, control unit 10 performs a process associated with the key. When a touch is on a position where a key is not displayed, control unit 10 determines that the touch is an error and performs no process.

In step S5, if it is determined that the timer is enabled (YES in S5), control unit 10 performs a timer setting process (S7). The timer setting process, which will be detailed later, is a process of setting the length of the wait time (timer time) during which a second touch of multi-touch is to be detected. Control unit 10 starts measuring of the timer (starts the timer) (S9) and determines whether the measurement time of the timer is within the set wait time (whether it does not reach the wait time) (S11).

In step S11, if it is determined that the measurement time of the timer is within the wait time (YES in S11), control unit 10 determines whether a second touch on touch panel 101 is detected (S13).

In step S13, if it is determined that a second touch is detected (YES in S13), control unit 10 determines that the first touch and the second touch are multi-touch (S15) and stops the timer. The process then ends.

In step S15, if control unit 10 determines that the touches are multi-touch, and if the position of the first touch and the position of the second touch are thereafter moved apart, control unit 10 detects pinch-out and performs a process of enlarging the screen. On the other hand, if it is determined that the touches are multi-touch, and if the position of the first touch and the position of the second touch are moved closer, control unit 10 determines pinch-in and performs a process of reducing the screen.

In step S13, if it is determined that a second touch is not detected (NO in S13), the process of control unit 10 proceeds to step S11.

In step S11, if it is determined that the measurement time of the timer reaches the wait time (NO in S11), control unit 10 determines that the touch detected in the processing in step S1 is single touch, and stops the timer and performs the process corresponding to the touch (S17). The process then ends.

[Method of Determining Availability of Timer]

Specific examples of a method of determining the timer availability will now be described one by one.

(A) First Method of Determining Availability of Timer

Figure 4:
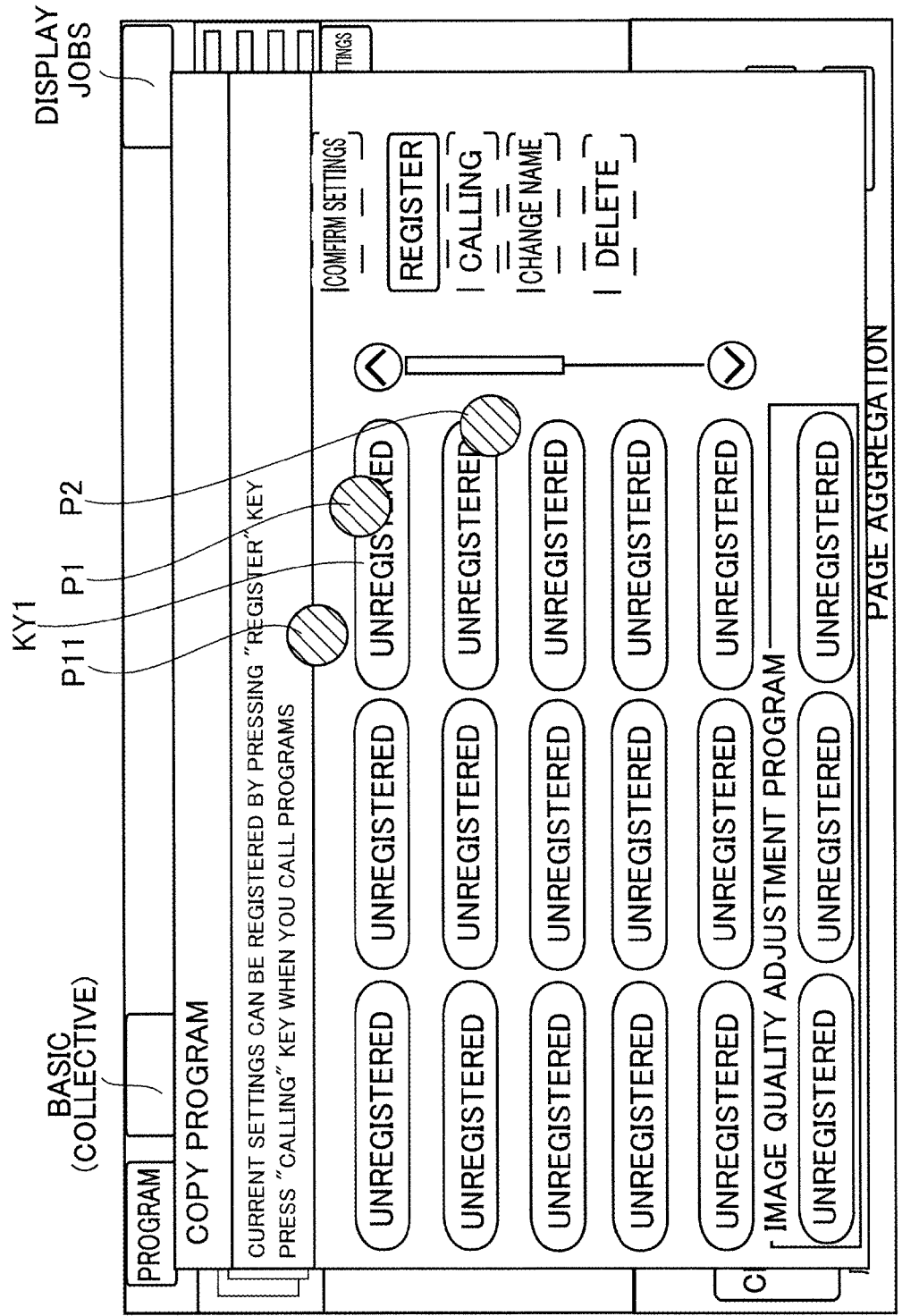
FIG. 4 is a diagram illustrating a first method of determining the availability of a timer.

FIG. 4 is a diagram illustrating a first method of determining the availability of the timer.

Referring to FIG. 4, a screen (copy program registration screen) for registering a setting condition of a copy job in one of a plurality of keys KY1 appears on touch panel 101. When a touch is detected, MFP 1 determines the availability of the timer based on whether a key is displayed at the position of the touch.

Specifically, MFP 1 determines that the timer is enabled if a touch (a first touch) on touch panel 101 is detected and if the touch is a touch on the position where one of a plurality of keys KY1 is displayed (for example, position P1). On the other hand, MFP 1 determines that the timer is disabled if a touch on touch panel 101 is detected and if the touch is a touch on a position where none of a plurality of keys KY1 is displayed (for example, position P11).

If it is determined that the timer is enabled, MFP 1 sets a wait time (for example, 100 ms), which varies depending on the position of the touch, in the subsequent process. MFP 1 then starts the timer and, if a touch (a second touch) on any position (for example, position P2) on touch panel 101 is detected before the measurement time of the timer has passed the wait time, determines that the first touch and the second touch are multi-touch. The process subsequent to the determination that the timer is enabled will be described later.

If it is determined that the timer is disabled, MFP 1 does not start the timer in the subsequent process. MFP 1 determines that this touch is single touch and performs a process corresponding to the single touch. Here, MFP 1 performs no process since no key is present at position P11.

Figure 5:
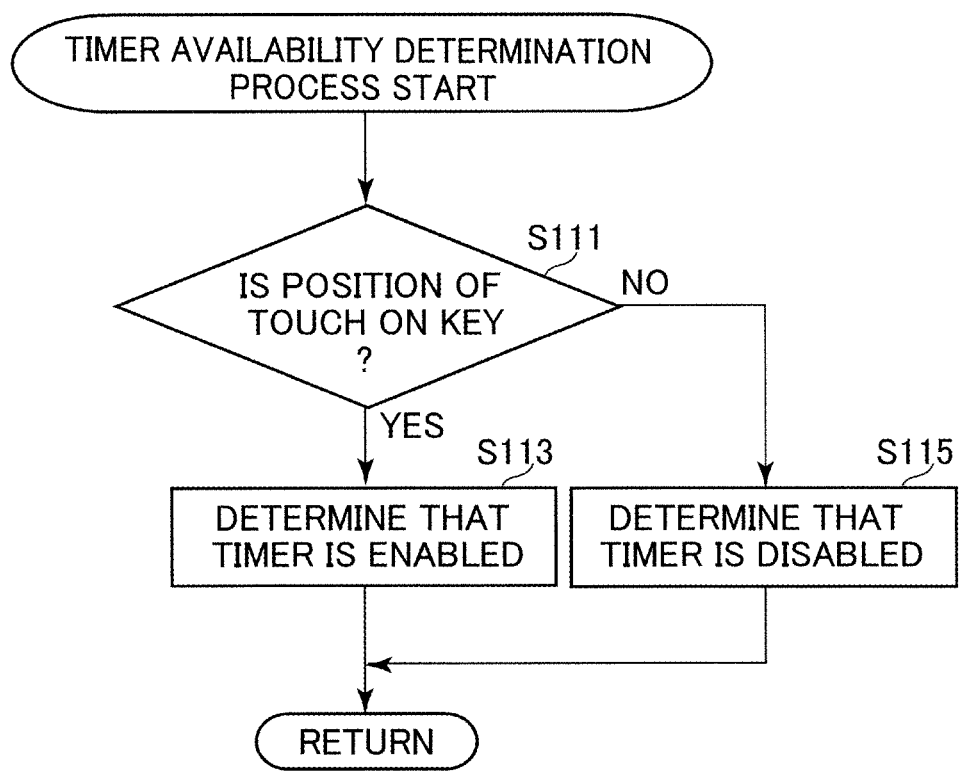
FIG. 5 shows a subroutine of a timer availability determination process in a case where the first method of determining the availability of the timer is employed.

FIG. 5 shows a subroutine of the timer availability determination process in a case where the first method of determining the availability of the timer is employed. The subroutines shown in FIG. 5, FIG. 7, and FIG. 9 below are subroutines of the timer availability determination process shown in step S3 in FIG. 3.

Referring to FIG. 5, in the timer availability determination process, control unit 10 determines whether the position of the detected touch is on a key (S111).

In step S111, if it is determined that the position of the touch is on a key (YES in S111), control unit 10 determines that the timer is enabled (S113). The process then returns. On the other hand, in step S111, if it is determined that the position of the touch is not on a key (NO in S111), control unit 10 determines that the timer is disabled (S115). The process then returns.

When a user makes a touch on a key, it is likely that the user intends to enlarge a screen in order to make the character on the key more legible or enhance the ease of pressing the key. When the user makes a touch on a key, therefore, MFP 1 has to determine whether the touch is single touch for pressing the key or a first touch of multi-touch for enlarging the display. According to the first determination method, if the position of the touch accepted from the user is on a key, MFP 1 determines that the timer is enabled, and starts the timer. In the subsequent process, MFP 1 then determines whether the touch is single touch for pressing the key or a first touch of multi-touch for enlarging the display. On the other hand, when the user makes a touch at a position that is not on a key, it is less likely that the user intends to enlarge the screen. According to the first determination method, when the position of the touch accepted from the user is not on a key, MFP 1 determines that the timer is disabled and does not start the timer. MFP 1 thus can promptly perform a process corresponding to the accepted touch.

(B) Second Method of Determining Availability of Timer

Figure 6:
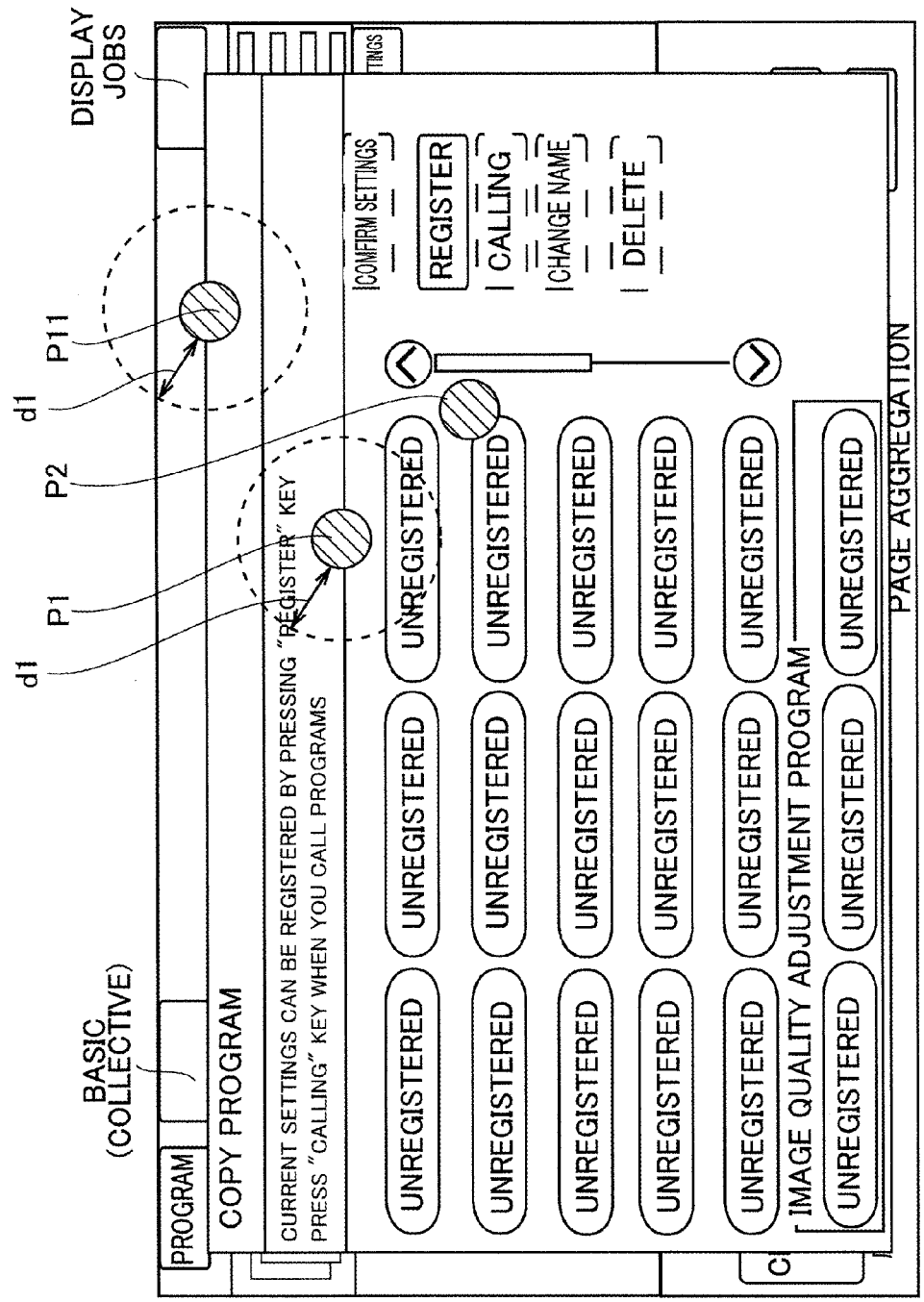
FIG. 6 is a diagram illustrating a second method of determining the availability of the timer.

FIG. 6 is a diagram of a second method of determining the availability of the timer.

Referring to FIG. 6, when a touch is detected, MFP 1 determines the availability of the timer based on whether a character smaller than a predetermined size is present within a predetermined distance from the position of the touch.

Specifically, if a touch (a first touch) on touch panel 101 is detected and if a character smaller than a predetermined size (for example 10 pt) is present within a predetermined distance from the position of the touch, MFP 1 determines that the timer is enabled. For example, when a touch on position P1 is detected, a character smaller than the size of 10 pt is present within a distance d1 from position P1 (within a circle indicated by the dotted line), and MFP 1 then determines that the timer is enabled.

On the other hand, if a touch on touch panel 101 is detected and if a character smaller than a predetermined size is not present within a predetermined distance from the position of the touch, MFP 1 determines that the timer is disabled. For example, when a touch at position P11 is detected, a character smaller than the size of 10 pt is not present within distance d1 from position P11 (the circle indicate by the dotted line), MFP 1 determines that the timer is disabled.

Figure 7:
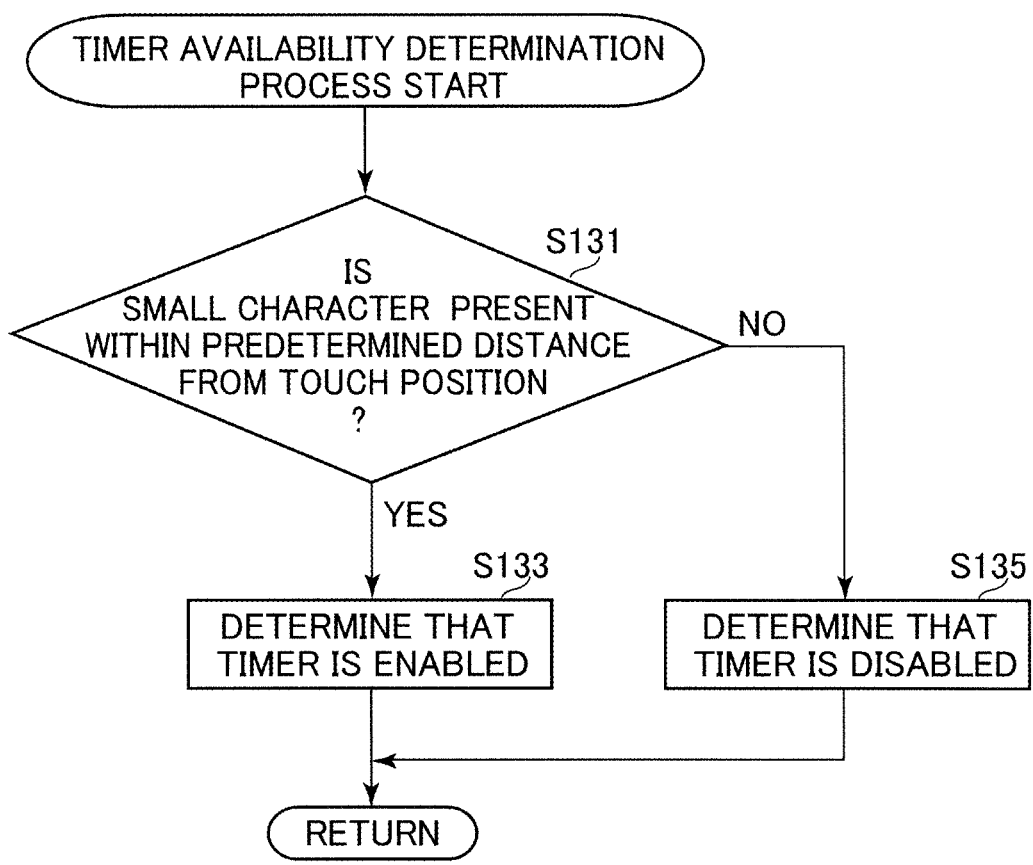
FIG. 7 shows a subroutine of the timer availability determination process in a case where the second method of determining the availability of the timer is employed.

FIG. 7 shows a subroutine of the timer availability determination process in a case where the second method of determining the availability of the timer is employed.

Referring to FIG. 7, in the timer availability determination process, control unit 10 determines whether a character smaller than a predetermined size is present within a predetermined distance from the position of the detected touch (S131).

In step S131, if it is determined that a character smaller than a predetermined size is present within a predetermined distance from the position of the touch (YES in S131), control unit 10 determines that the timer is enabled (S133).

The process then returns. On the other hand, in step S131, if it is determined that a character smaller than a predetermined size is not present within a predetermined distance from the position of the touch (NO in S131), control unit 10 determines that the timer is disabled (S135). The process then returns.

When the user makes a touch at a position close to a small character, it is likely that the user intends to enlarge the screen in order to make the character more legible. When the user makes a touch at a position close to a small character, therefore, MFP 1 has to determine whether the touch is single touch for pressing a key or a first touch of multi-touch for enlarging the display. According to the second determination method, when the user makes a touch at a position close to a small character, MFP 1 determines that the timer is enabled and starts the timer. In the subsequent process, MFP 1 then determines whether the touch is single touch for pressing a key or a first touch of multi-touch for enlarging the display. On the other hand, when the user makes a touch at a position distant from a small character, it is less likely that the user intends to enlarge the screen. According to the second determination method, when the user makes a touch at a position distant from a small character, MFP 1 determines that the timer is disabled and does not start the timer. MFP 1 thus can promptly perform a process corresponding to the accepted touch.

(C) Third Method of Determining Availability of Timer

Figure 8:
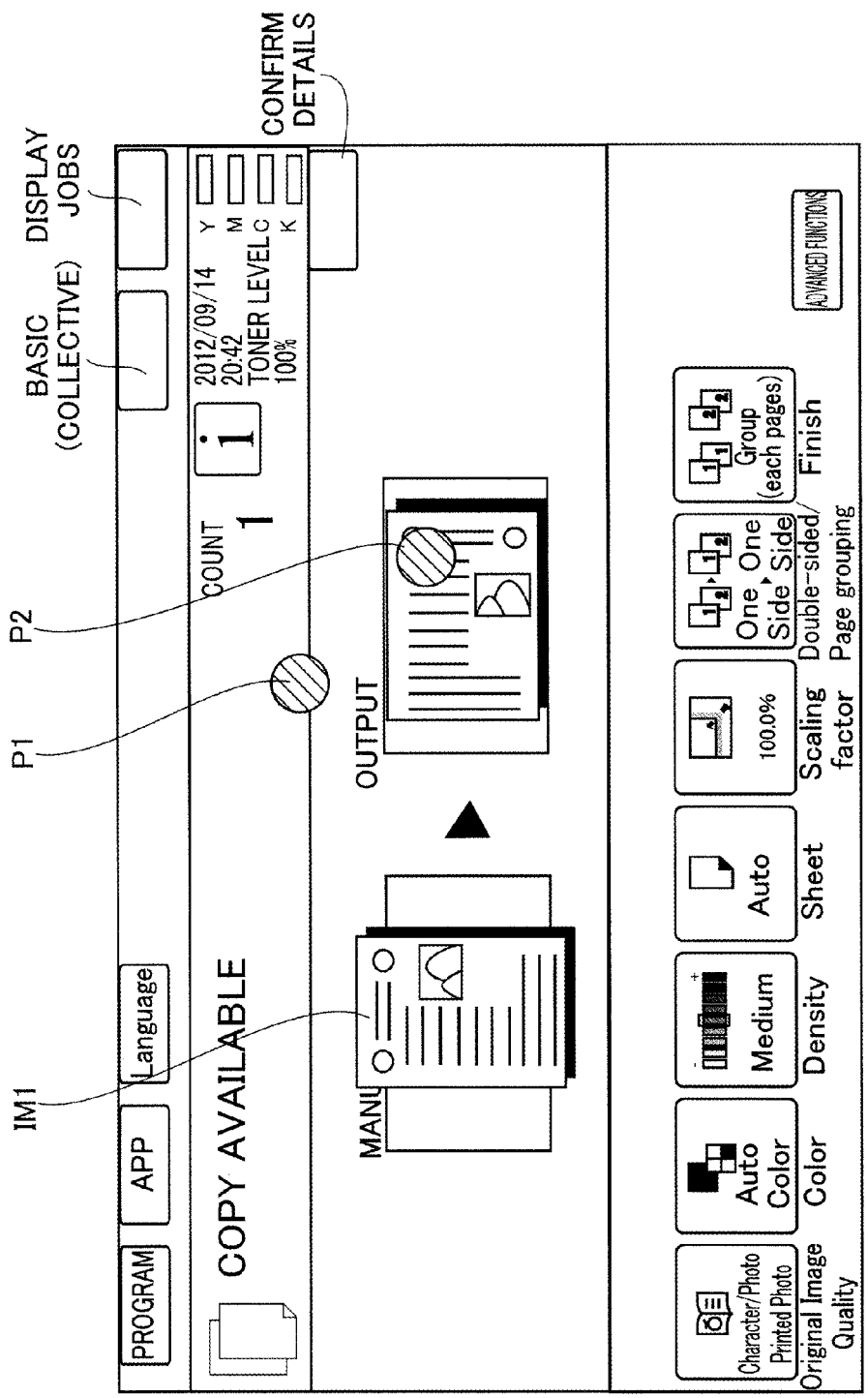
FIG. 8 is a diagram illustrating a third method of determining the availability of the timer.

FIG. 8 is a diagram illustrating a third method of determining the availability of the timer. FIG. 8 schematically shows the position of a touch on touch panel 101.

Referring to FIG. 8, a preview image IM1 of an image of a document scanned by scanner 110 appears on touch panel 101. When a touch is detected, MFP 1 determines the availability of the timer based on whether a screen that includes at least one of a preview image and a thumbnail image appears on touch panel 101.

Specifically, if a touch on touch panel 101 (for example, a touch at position P1) (a first touch) is detected and if a screen that includes at least one of a preview image and a thumbnail image (here, a screen including a preview image IM1) appears on touch panel 101, MFP 1 determines that the timer is enabled.

On the other hand, if a touch on touch panel 101 is detected and if a screen that includes neither a preview image nor a thumbnail (for example, the screen shown in FIG. 4) appears on touch panel 101, MFP 1 determines that the timer is disabled.

If it is determined that the timer is enabled, and if it is determined in the subsequent process that the detected touch is pinch-out or pinch-in, the preview image is enlarged or reduced. If a press on start key 102a is accepted with the enlarged or reduced image being displayed, MFP 1 forms an image corresponding to the preview image on paper, using image forming unit 23.

Figure 9:
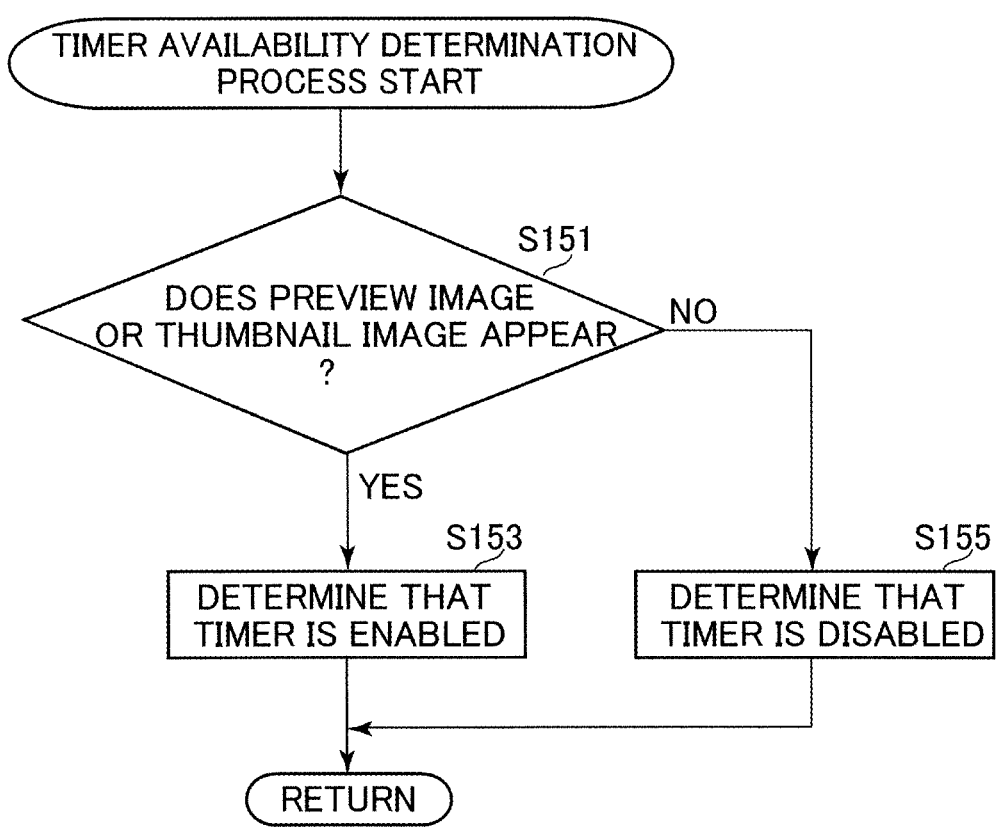
FIG. 9 shows a subroutine of the timer availability determination process in a case where the third method of determining the availability of the timer is employed.

FIG. 9 shows a subroutine of the timer availability determination process in a case where the third method of determining the availability of the timer is employed.

Referring to FIG. 9, in the timer availability determination process, control unit 10 determines whether a screen that includes at least one of a preview image and a thumbnail image appears on touch panel 101 (S151).

In step S151, if it is determined that a screen that includes at least one of a preview image and a thumbnail image appears on touch panel 101 (YES in S151), control unit 10 determines that the timer is enabled (S153). The process then returns. On the other hand, in step S151, if it is determined that a screen that includes at least one of a preview image and a thumbnail image does not appear on touch panel 101 (NO in S151), control unit 10 determines that the timer is disabled (S155). The process then returns.

When a preview image or a thumbnail image appears on touch panel 101, it is likely that the user intends to enlarge the screen in order to view the image in more detail. When a user makes a touch, if a preview image and/or a thumbnail image appears on touch panel 101, therefore, MFP 1 has to determine whether the touch is single touch of pressing a key or a first touch of multi-touch for enlarging the display. According to the third determination method, when a touch is detected, if a preview image or a thumbnail image appears on touch panel 101, MFP 1 determines that the timer is enabled and starts the timer. In the subsequent process, MFP 1 then determines whether the touch is single touch for pressing a key or a first touch of multi-touch for enlarging the display.

According to the third method of determining the availability of the timer, when a touch is detected, if a preview image or a thumbnail image does not appear on touch panel 101, MFP 1 determines that the timer is disabled and does not start the timer. MFP 1 thus can promptly perform a process corresponding to the accepted touch.

(D) Others

The first to third determination methods above may be combined as appropriate. For example, in a combination of the first determination method and the second determination method, in at least one of a case where a key is displayed at the position of the detected touch and a case where a character smaller than a predetermined size is present within a predetermined distance from the position of the detected touch, it may be determined that the timer is enabled; otherwise it may be determined that the timer is disabled. In a combination of the first determination method and the third determination method, in at least one of a case where a key is displayed at the position of the detected touch and a case where a screen that includes at least one of a preview image and a thumbnail image appears on touch panel 101, it may be determined that the timer is enabled; otherwise it may be determined that the timer is disabled. In a combination of the second determination method and the third determination method, in at least one of a case where a character smaller than a predetermine size is present within a predetermined distance from the position of the detected touch and a case where a screen that includes at least one of a preview image and a thumbnail image appears on touch panel 101, it may be determined that the timer is enabled; otherwise it may be determined that the timer is disabled. In a combination of all of the first to third determination methods, in at least one of a case where a key is displayed at the position of the detected touch, a case where a character smaller than a predetermine size is present within a predetermined distance from the position of the detected touch, and a case where a screen that includes at least one of a preview image and a thumbnail image appears on touch panel 101, it may be determined that the timer is enabled; otherwise it may be determined that the timer is disabled.

MFP 1 may set the wait time zero instead of determining that the timer is disabled in the first to third determination processes.

MFP 1 may always start the timer when a first touch is detected, without determining the availability of the timer.

[Method of Setting Wait Time]

A method of setting a wait time will now be described specifically. In the present embodiment, a wait time is set based on a region-dependent time and an environment-considered time.

(A) Overview of Method of Setting Wait Time

Figure 10:
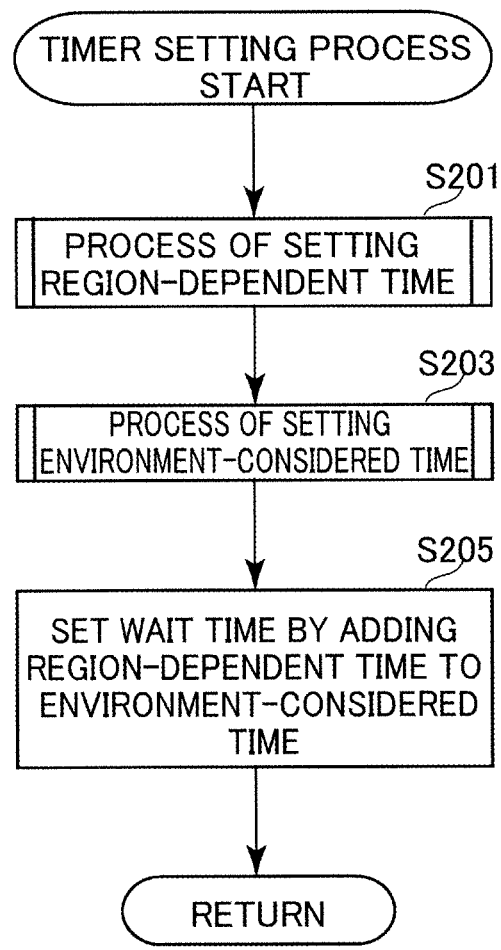
FIG. 10 shows a subroutine of a timer setting process shown in step S7 in FIG. 3.

FIG. 10 shows a subroutine of the timer setting process shown in step S7 in FIG. 3.

Referring to FIG. 10, in the timer setting process, control unit 10 performs a process of setting a region-dependent time (S201). The region-dependent time is a time set based on in which region the position of the touch detected by MFP 1 is included, in a screen on touch panel 101 that is virtually divided into a plurality of regions. This setting process will be described in the item (B) below.

Control unit 10 then performs a process of setting an environment-considered time (S203). The environment-considered time is a time set considering the use environment of operation panel 100 (the factor that affects the wait time), such as the inclination angle of the operation panel and the height of the user. This setting process will be described in the item (C) below.

Control unit 10 then sets a wait time by adding the region-dependent time to the environment-considered time (S205). The process then returns.

FIG. 11 is a diagram schematically showing a positional relationship between the user's hand and operation panel 100. In FIG. 11(b), the display surface of touch panel 101 is more inclined than that in FIG. 11(a) and is almost vertical.

Referring to FIG. 11(a), the user's hands HD1 to HD3 touching touch panel 101 are schematically shown. Hands HD1 to HD3 differ in orientation of the index finger. The index finger of hand HD1 extends almost vertically. The index finger of hand HD2 is more inclined than that of HD1. The index finger of hand HD3 is more inclined than that of hand HD2 and extends in a direction close to the horizontal direction.

When a user performs multi-touch on touch panel 101, the user generally makes a first touch with the index finger or the middle finger on touch panel 101 and makes a second touch with the thumb. This is because the index finger or the middle finger is longer than the thumb and is positioned on the upper portion of touch panel 101. To locate the thumb on the upper portion of touch panel 101 higher than the index finger or the middle finger, the user has to turn the palm upside down and bring the hand in an awkward position. In the present embodiment, the wait time is set considering the difference in length between the thumb and the index finger or the middle finger.

When the user touches the upper portion of the touch panel 101, the user's hand touching touch panel 101 comes into a state close to hand HD3. In this case, the position of the thumb with the index finger making a first touch is close to touch panel 101, and, therefore, the time lag between the first touch and the second touch is likely to be small.

On the other hand, when the user touches the lower portion of touch panel 101, the user's hand touching touch panel 101 comes into a state close to hand HD1. In this case, the position of the thumb with the index finger making a first touch is far from touch panel 101, and therefore, the time lag between the first touch and the second touch is likely to be large.

Based on the facts as described above, it can be understood that the wait time for determining whether a touch is multi-touch is preferably set longer when the first touch on touch panel 101 is in the lower portion than when it is in the upper portion.

In a case where the user is short in height, the base of the user's arm operating touch panel 101 is present in a direction close to the horizontal direction relative to operation panel 100, and the user's hand touching touch panel 101 comes into a state close to hand HD3. In this case, since the position of the thumb with the index finger making a first touch is close to touch panel 101, the time lag between the first touch and the second touch is likely to be small.

On the other hand, in a case where the user is tall in height, the base of the user's arm operating touch panel 101 is present in a direction close to the vertical direction relative to operation panel 100, and the user's hand touching touch panel 101 comes into a state close to hand HD1. In this case, since the position of the thumb with the index finger making a first touch is far from touch panel 101, the time lag between the first touch and the second touch is likely to be large.

Based on the facts as described above, it can be understood that the wait time for determining whether a touch is multi-touch is preferably set longer when an operation on operation panel 100 by a tall user is accepted than when an operation on operation panel 100 by a short user is accepted.

Referring to FIG. 11(b), user's hands HD4 to HD6 touching touch panel 101 are schematically shown. Hands HD4 to HD6 differ in orientation of the index finger. The index finger of hand HD4 extends almost vertically. The index finger of hand HD5 is more inclined than that of hand HD4. The index finger of hand HD6 is more inclined than that of hand HD5 and extends in a direction close to the horizontal direction.

In FIG. 11(b), it can be understood that when the first touch on touch panel 101 is in the lower portion (in the case of hand HD4), the time lag between the first touch and the second touch is likely to be larger than when it is in the upper portion (in the case of hand HD6), and the wait time for determining whether a touch is multi-touch is preferably set longer.

It can also be understood that when an operation on operation panel 100 by a tall user is accepted (in the case of hand HD4), the time lag between the first touch and the second touch is likely to be larger than when an operation on operation panel 100 by a short user is accepted (in the case of hand HD6), and the wait time for determining whether a touch is multi-touch is preferably set longer.

Referring to FIGS. 11(a) and 11(b), compare hand HD1 with hand HD4. When the display surface of touch panel 101 is close to the vertical (in the case of hand HD4), the position of the thumb with the index finger making a first touch is farther from touch panel 101 than the position of the thumb with the index finger making a first touch when the display surface of touch panel 101 is close to the horizontal direction (in the case of hand HD1). The same thing can be said when hand HD2 is compared with hand HD5 and when hand HD3 is compared with hand HD6. Accordingly, the time lag between the first touch and the second touch is likely to increase as the display surface of touch panel 101 is closer to the vertical.

Based on the facts described above, it can be understood that it is preferable that the closer is the display surface of touch panel 101 to the vertical, the longer wait time for determining whether a touch is multi-touch is set.

(B) Method of Setting Region-Dependent Time

Specific examples of a method of setting a region-dependent time will now be described one by one.

(B-1) First Method of Setting Region-Dependent Time

Figure 12:
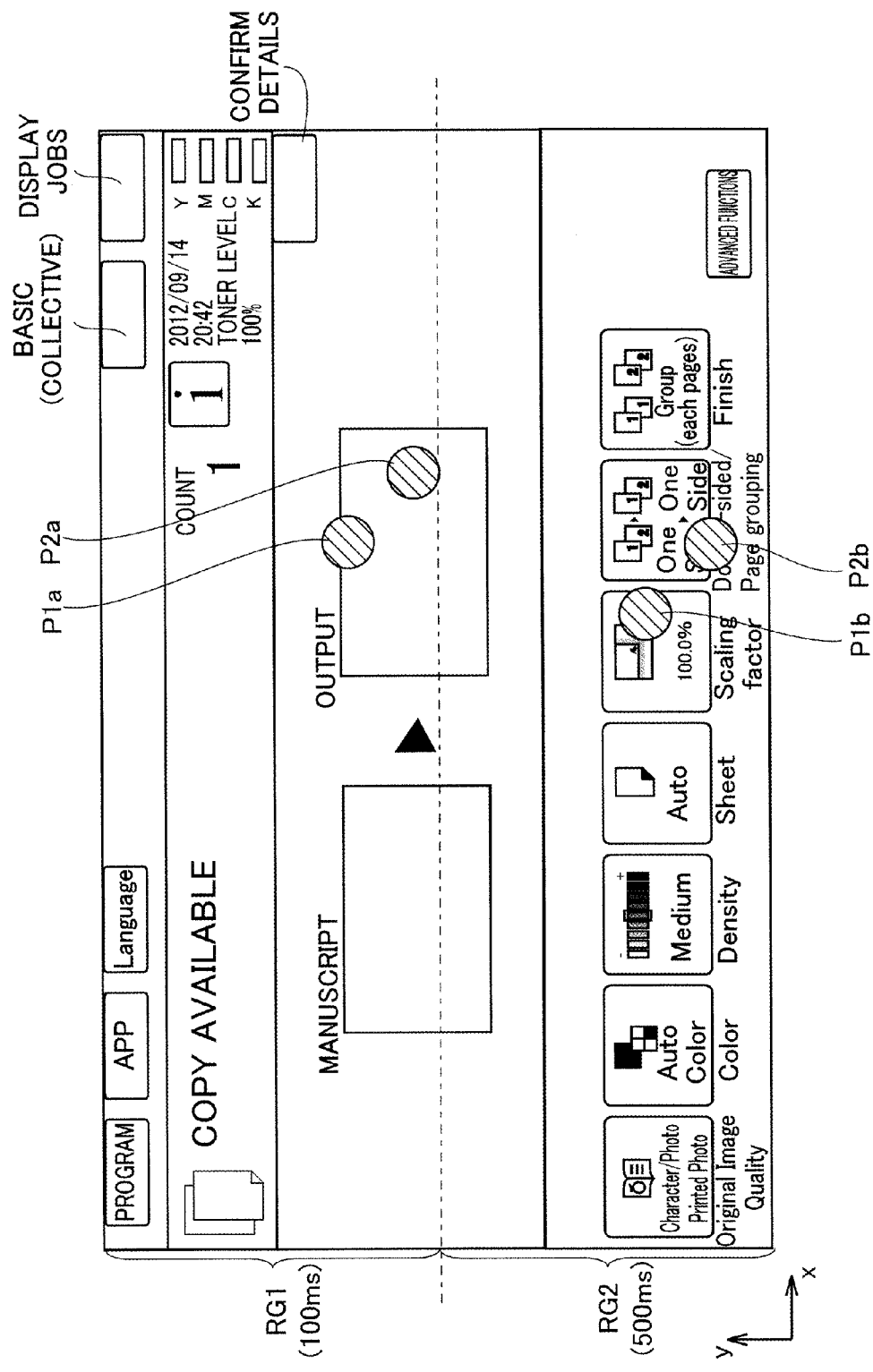
FIG. 12 is a diagram illustrating a first method of setting a region-dependent time.

FIG. 12 is a diagram illustrating a first method of setting a region-dependent time. FIG. 12 schematically shows the position of a touch on touch panel 101. In FIG. 12, FIG. 14, FIG. 15, FIG. 21, and FIG. 23, the upward direction in the screen on touch panel 101 is the direction in the x-axis, and the rightward direction is the direction in the y-axis.

Referring to FIG. 12, a screen for accepting basic settings of a copy job appears on touch panel 101. MFP 1 virtually divides the screen on touch panel 101 into a plurality of regions arranged in the up-down direction and sets a unique value of time for each of the divided regions. MFP 1 sets a unique value for each of the regions such that a lower region in the screen on touch panel 101 has a longer unique value. MFP 1 then determines in which of the regions the position of the detected touch is included and sets a unique value set for the region determined to include the position of the touch, as a region-dependent time.

Specifically, MFP 1 virtually divides the screen on touch panel 101 into a region RG1 and a region RG2. Region RG1 is a region above the center line (the line indicated by the chain line) of the screen, and region RG2 is a region below the center line of the screen. Regions RG1 and RG2 are arranged in the up-down direction of the screen on touch panel 101 and each extend in the lateral direction. MFP 1 sets a unique value of time for each of regions RG1 and RG2 such that the unique value of region RG2 is longer than the unique value of region RG1. For example, the unique value of region RG1 is set to 100 ms, and the unique value of region RG2 is set to 500 ms.

MFP 1 determines in which of regions RG1 and RG2 the position of the touch is included, based on the coordinate (y-coordinate) in the up-down direction of the position of the detected touch. When the position of the detected touch is position P1a, MFP 1 determines that position P1a is included in region RG1 and sets the unique value (100 ms) set for region RG1 as a region-dependent time. When the position of the detected touch is position P1b, MFP 1 determines that position P1b is included in region RG2 and sets the unique value (500 ms) set for region RG2 as a region-dependent time. Positions P2a and P2b show the positions of the second touch in a case where the first touch is on positions P1a and P1b, respectively.

Figure 13:
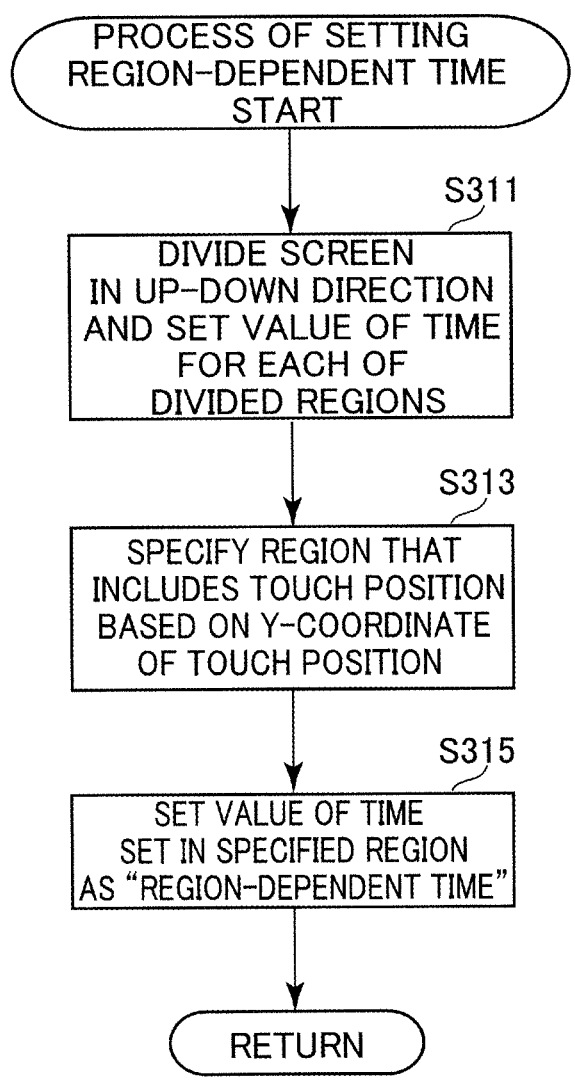
FIG. 13 shows a subroutine of a process of setting a region-dependent time in a case where the first method of setting a region-dependent time is employed.

FIG. 13 shows a subroutine of a process of setting a region-dependent time in a case where the first method of setting a region-dependent time is employed. The subroutines shown in FIG. 13, FIG. 20, and FIG. 22 below are subroutines of the process of setting a region-dependent time shown in step S201 in FIG. 10.

Referring to FIG. 13, in the process of setting a region-dependent time, control unit 10 virtually divides a screen on touch panel 101 in the up-down direction and sets a unique value of time for each of the divided regions (S311). Control unit 10 then specifies a region that includes the position of the touch based on the coordinate in the longitudinal direction (y-coordinate) of the position of the detected touch (S313). Control unit 10 then sets a unique value of time set in the specified region as a region-dependent time (S315). The process then returns.

As explained with reference to FIG. 11, it is likely that the time lag between the first touch and the second touch is larger when the user touches the lower portion of touch panel 101 than when the user touches the upper portion.

If a fixed wait time is set irrespective of the position of a touch on the touch panel as in the conventional example, multi-touch on the upper portion of the touch panel can be detected but multi-touch on the lower portion of the touch panel cannot be detected; otherwise, multi-touch on the lower portion of the touch panel can be detected appropriately but the wait time for detecting multi-touch on the upper portion of the touch panel is too long. According to the first method of setting a region-dependent time, the wait time for detecting the second touch of multi-touch is set longer when the position of the first touch on touch panel 101 is in the lower portion than when the position of the first touch on touch panel 101 is in the upper portion, whereby the user's multi-touch can be detected appropriately.

(B-2) Second Method of Setting Region-Dependent Time

Figure 14:
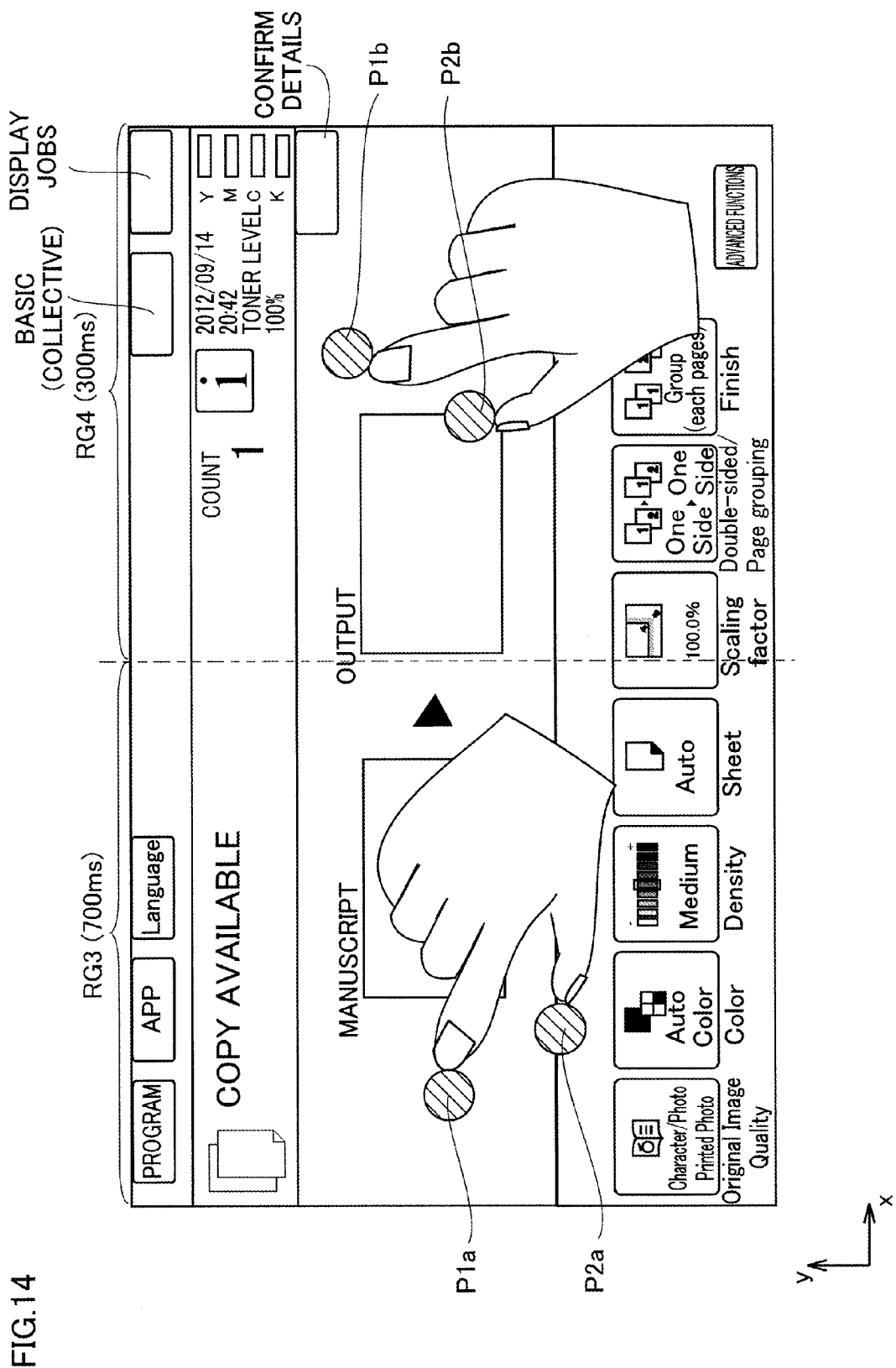
FIG. 14 is a diagram schematically showing that a right-handed user makes a touch on touch panel 101.
Figure 15:
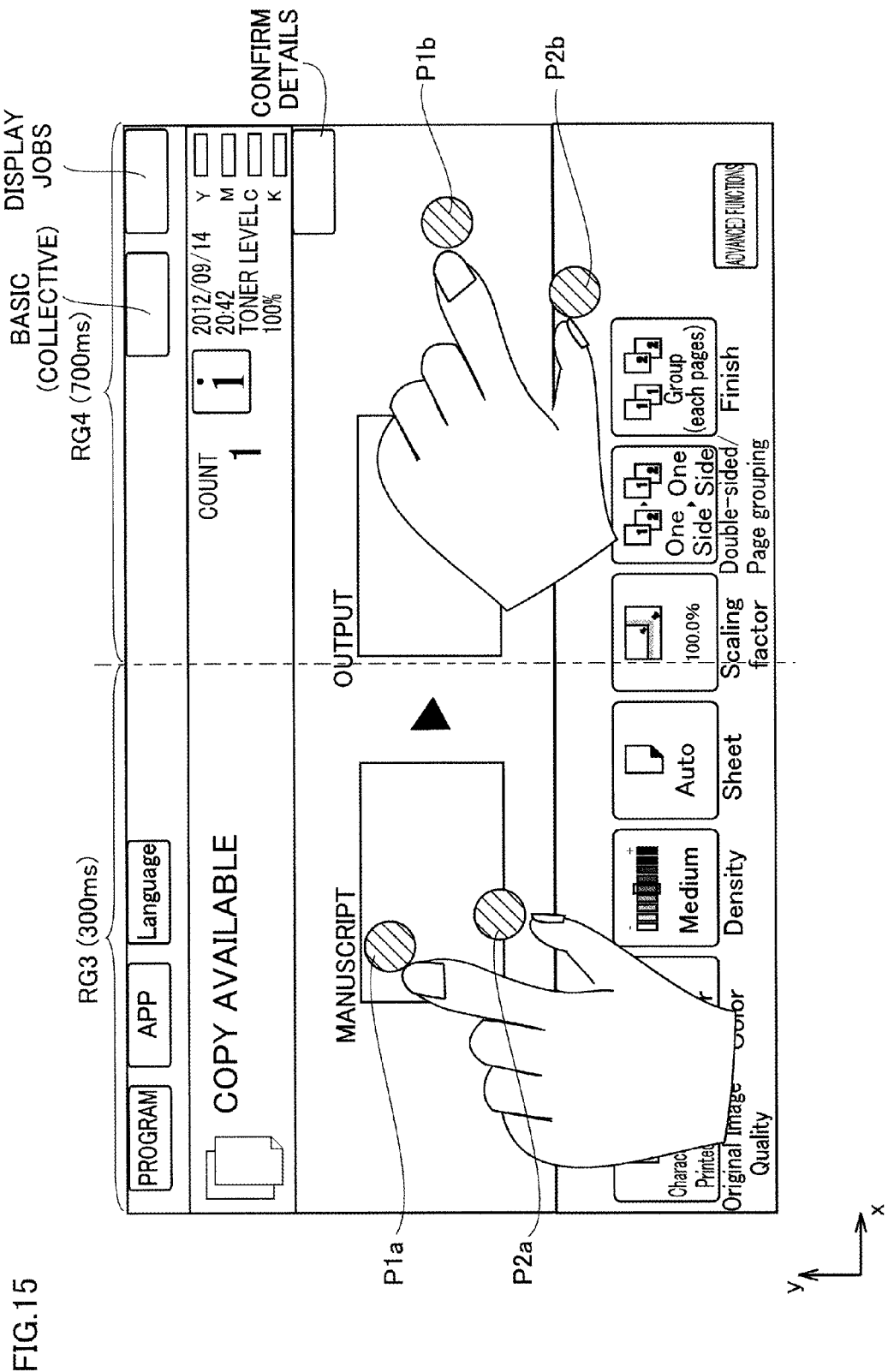
FIG. 15 is a diagram schematically showing that a left-handed user makes a touch on touch panel 101.

FIG. 14 is a diagram schematically showing that a right-handed user makes a touch on touch panel 101. FIG. 15 is a diagram schematically showing that a left-handed user makes a touch on touch panel 101.

Referring to FIG. 14, MFP 1 virtually divides a screen on touch panel 101 into a plurality of regions arranged in the lateral direction and sets a unique value of time for each of the divided regions. MFP 1 acquires information of the dominant hand of the user and, if the information indicates that the user is right-handed, sets a unique value for each of the regions such that a region on the left side in the screen of touch panel 101 has a longer unique value. MFP 1 then determines in which of the regions the position of the detected touch is included and sets the unique value set for the region determined to include the position of the touch, as a region-dependent time.

Specifically, MFP 1 virtually divides a screen on touch panel 101 into regions RG3 and RG4. Region R3 is a region on the left side with respect to the center line of the screen (the line shown by the two-dot chain line), and region RG4 is a region on the right side with respect to the center line of the screen. Regions RG3 and RG4 are arranged in the lateral direction of the screen on touch panel 101 and each extend in the up-down direction. In a case where the user is right-handed, MFP 1 sets a unique value of time for each of regions RG4 and RG3 such that the unique value of region RG4 is longer than the unique value of RG3. For example, the unique value of region RG3 is set to 700 ms, and the unique value of region RG4 is set to 300 ms.

MFP 1 determines in which of regions RG3 and RG4 the position of the touch is included, based on the coordinate in the lateral direction (x-coordinate) of the position of the detected touch. When the position of the detected touch is position P1a, MFP 1 determines that position P1a is included in region RG3 and sets the unique value (700 ms) set in region RG3 as a region-dependent time. When the position of the detected touch is position P1b, MFP 1 determines that position P1b is included in region RG4 and sets the unique value (300 ms) set in region RG4 as a region-dependent time. Positions P2a and P2b show the positions of the second touch in a case where the positions of the first touch are positions P1a and P1b, respectively.

Referring to FIG. 15, MFP 1 acquires the information of the user's dominant hand and, if the information indicates that the user is left-handed, sets a unique value for each of the regions such that the region on the right side of the screen on touch panel 101 has a longer unique value. MFP 1 then determines in which of the regions the position of the detected touch is included and sets the unique value set for the region determined to include the position of the touch, as a region-dependent time.

Specifically, in a case where the user is left-handed, MFP 1 sets a unique value of time for each of regions RG4 and RG3 such that the unique value of region RG3 is longer than the unique value of RG4. For example, the unique value of region RG3 is set to 300 ms, and the unique value of region RG4 is set to 700 ms.

MFP 1 determines in which of regions RG3 and RG4 the position of the touch is included, based on the coordinate in the lateral direction (x-coordinate) of the position of the detected touch. When the position of the detected touch is position P1a, MFP 1 determines that position P1a is included in region RG3 and sets the unique value (300 ms)

set in region RG3 as a region-dependent time. When the position of the detected touch is position P1*b*, MFP 1 determines that position P1*b* is included in region RG4 and sets the unique value (700 ms) set in region RG4 as a region-dependent time. Positions P2*a* and P2*b* show the positions of the second touch in a case where the positions of the first touch are positions P1*a* and P1*b*, respectively.

A user generally operates operation panel 100 with the dominant hand and finds multi-touch more difficult as the distance of the position of a touch on touch panel 101 increases, and the time lag between the first touch and the second touch of multi-touch increases. In the second method of setting a region-dependent time, therefore, the farther is the first touch on touch panel 101 from the end on the dominant hand side, the longer wait time for detecting the second touch is set.

In the foregoing description, a unique value is set for each of regions RG3 and RG4. Alternatively, when the position of the first touch is in a region on the opposite side to the user's dominant hand, of regions RG3 and RG4, MFP 1 may set the longer unique value (700 ms) of two kinds of unique values as a region-dependent time. When the position of the first touch is in a region on the same side as the user's dominant hand, of regions RG3 and RG4, MFP 1 may set the shorter unique value (300 ms) of two kinds of unique values as a region-dependent time.

The information of the user's dominant hand can be acquired by any method. An example of the method of acquiring information of the user's dominant hand includes storing a user information database including information of the user's dominant hand, for example, in storage unit 24 in advance and acquiring the information of the user's dominant hand from the user information database. This method will be described below.

FIG. 16 is a diagram schematically showing the user information database.

Referring to FIG. 16, this user information database includes information of six users named "A," "B," "C," "D," "E," and "F." Each user information includes a user's name, a password, the height, and the dominant hand. In this user information database, for example, the user named "A" has a password "wulix9" and is "148 cm" in height and "right" handed. MFP 1 registers (stores) the user's information in the user information database through a user information registration process as described below.

Figure 17:
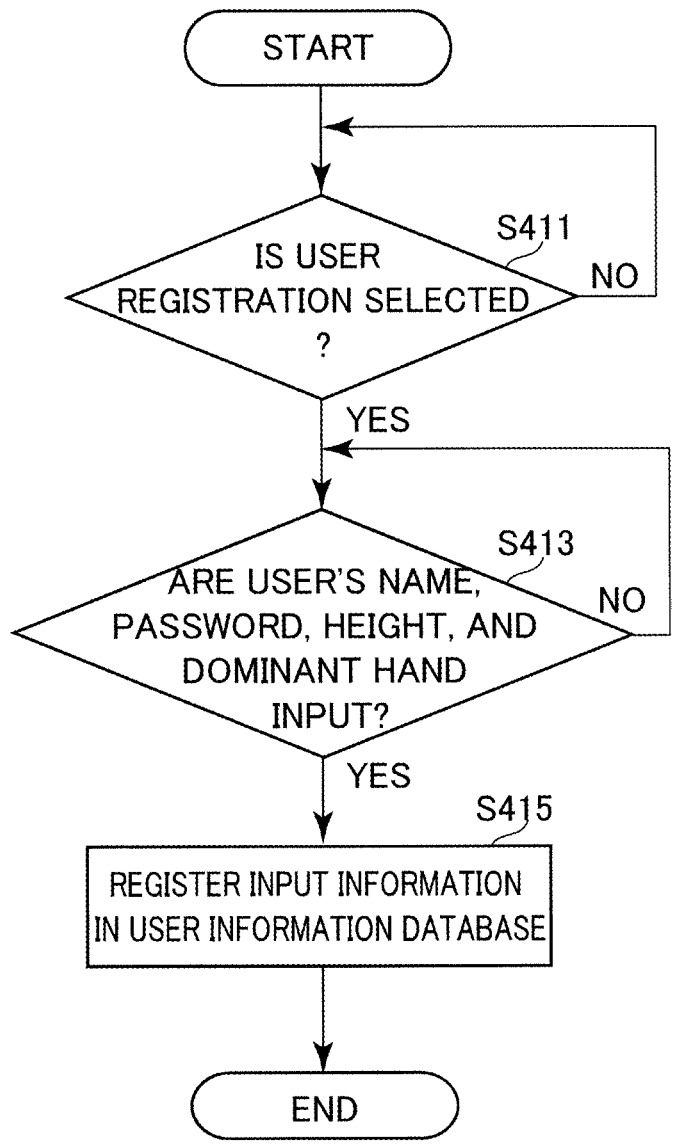
FIG. 17 is a flowchart showing a user information registration process executed by MFP 1.

FIG. 17 is a flowchart showing the user information registration process executed by MFP 1.

Referring to FIG. 17, control unit 10 determines whether user registration is selected (S411). MFP 1 accepts the selection of user registration, for example, from a software key appearing on touch panel 101, a hardware key of operation panel 100, or an external device connected to MFP 1. Control unit 10 repeats the processing in step S411 until it is determined that the selection of user registration is accepted.

In step S411, if it is determined that the selection of user registration is accepted (YES in S411), control unit 10 determines whether all the information including the user's name, password, height, and dominant hand is input (S413). MFP 1 accepts the information from operation panel 100 or an external device. Control unit 10 repeats the processing in step S413 until it is determined that all the information is input.

In step S413, if it is determined that all the information is input (YES in S413), control unit 10 registers the input information in the user information database (S415). The process then ends.

For example, when an operation on MFP 1 by a user is detected (when the start of operation on MFP 1 by a user is detected, or when access from an external device is detected), MFP 1 specifies the user who operates operation panel 100 through a login process described below.

Figure 18:
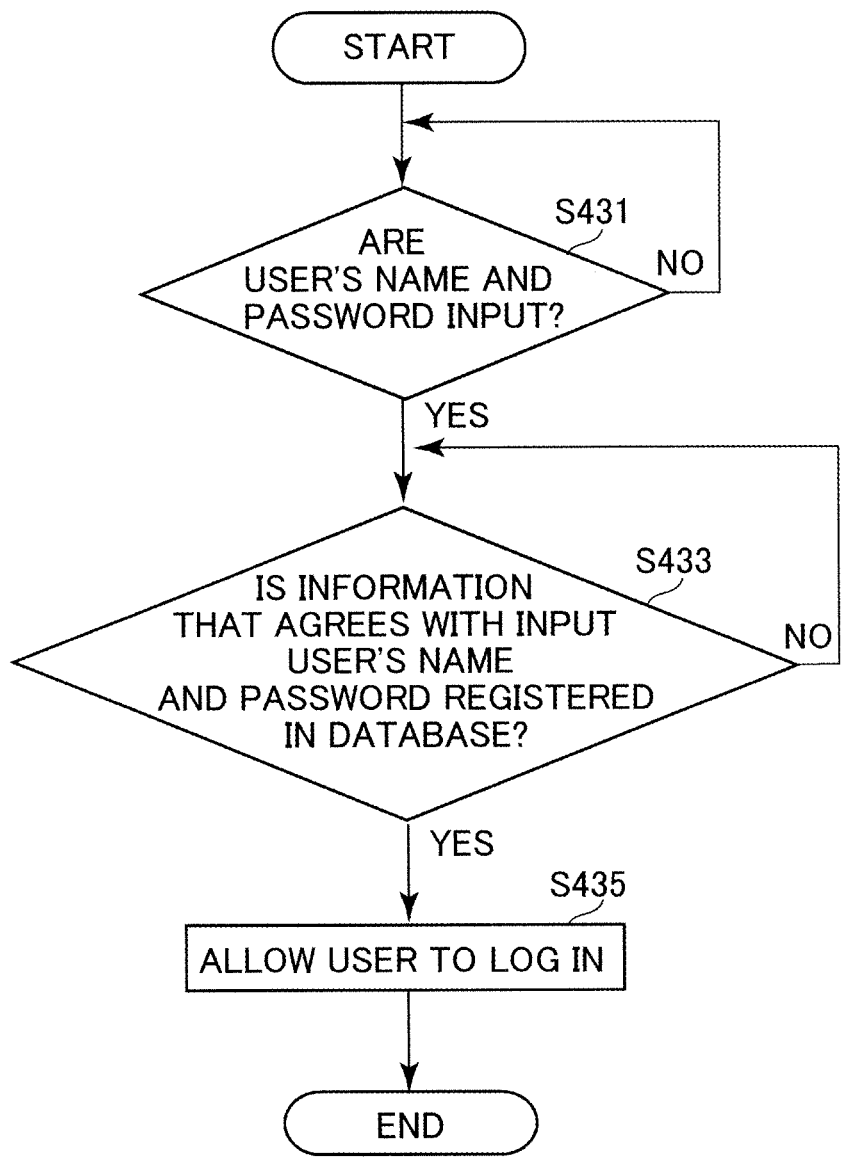
FIG. 18 is a flowchart showing a login process executed by MFP 1.

FIG. 18 is a flowchart showing the login process executed by MFP 1.

Referring to FIG. 18, control unit 10 detects an operation on MFP 1 by a user and then gives the user a message to ask for input of the user's name and password and determines whether information including the user's name and password is input (S431). Control unit 10 repeats the processing in step S431 until it is determined that the information is input.

In step S431, if it is determined that the information including the user's name and password is input (YES in S431), control unit 10 determines whether information that agrees with the input user's name and password is registered in the user information database (S433). Control unit 10 repeats the processing in step S433 until it is determined that information that agrees with the input user's name and password is registered in the user information database.

In step S433, if it is determined that information that agrees with the input user's name and password is registered in the user information database (YES in S433), control unit 10 permits an operation on MFP 1 by allowing the user having the input user name to log in (S435). The process then ends.

As described above, for example, when an operation on MFP 1 by a user is detected, MFP 1 specifies the user who operates operation panel 100 and acquires information of the user's dominant hand from the user information database.

Another method of acquiring information of the user's dominant hand includes specifying the user's dominant hand based on an operation performed on touch panel 101. Specifically, a key corresponding to the right hand and a key corresponding to the left hand as well as a message "Select the dominant hand" appear on touch panel 101 to prompt the user to press one of the two keys. Alternatively, information of the dominant hand may be acquired based on a flick operation performed on touch panel 101.

Figure 19:
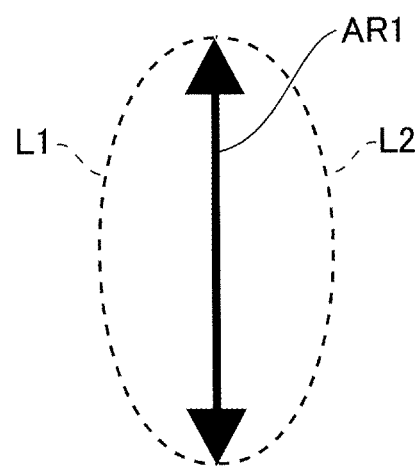
FIG. 19 is a diagram illustrating a method of acquiring information of the dominant hand based on a flick operation performed on touch panel 101.

FIG. 19 is a diagram illustrating a method of acquiring information of the dominant hand based on a flick operation performed on touch panel 101.

Referring to FIG. 19, when a flick operation in the upward direction or the downward direction as shown by arrow AR1 is detected, MFP 1 determines whether the path of the flick operation is a curve protruding leftward as shown by line L1 or a curve producing rightward as shown by line L2. In a case where a user is right-handed, the user generally performs a flick operation by moving the right hand so as to draw an arc around the right elbow. The resulting path of the flick operation is likely to be a curve of an arc protruding leftward as shown by line L1. When the path of a flick operation is close to line L1, MFP 1 therefore determines that the user is right-handed. On the other hand, in a case where a user is left-handed, the user generally performs a flick operation by moving the left hand so as to draw an arc around the left elbow. The resulting path of the flick operation is likely to be a curve of an arc protruding rightward as shown by line L2. When the path of a flick operation is close to line L2, MFP 1 therefore determines that the user is left-handed.

Figure 20:
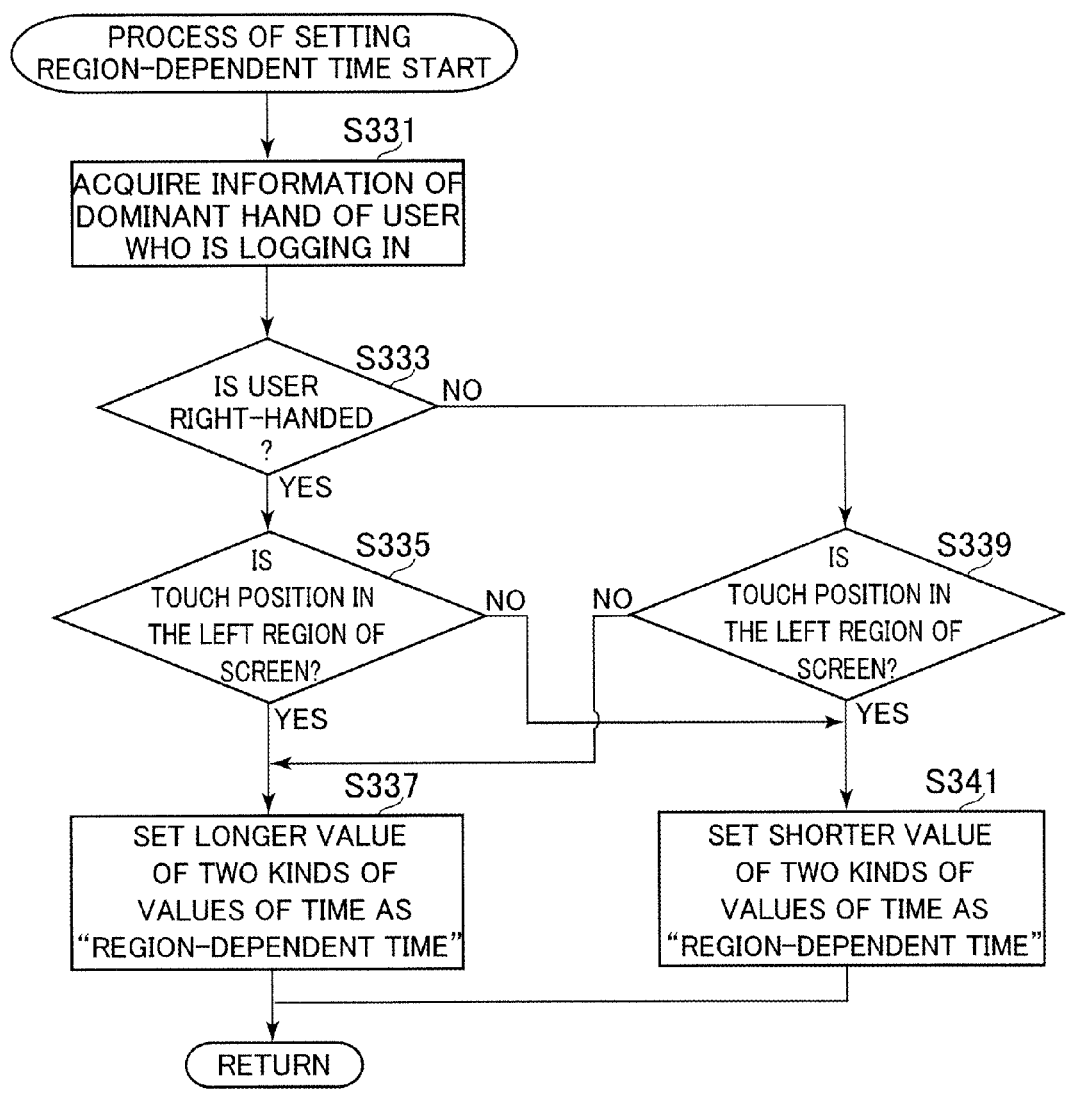
FIG. 20 shows a subroutine of the process of setting a region-dependent time in a case where a second method of setting a region-dependent time is employed.

FIG. 20 shows a subroutine of the process of setting a region-dependent time in a case where the second method of setting a region-dependent time is employed.

Referring to FIG. 20, in the process of setting a region-dependent time, control unit 10 acquires information of the dominant hand of the user who is logging in from the user information database (S331). Control unit 10 then determines whether the user is right-handed based on the acquired information (S333).

In step S333, if it is determined that the user is right-handed (YES in S333), control unit 10 determines whether the position of the detected touch is in the left region (region RG3) with respect to the center line of the screen on touch panel 101 (S335).

In step S335, if it is determined that the position of the detected touch is in the left region with respect to the center line of the screen on touch panel 101 (YES in S335), control unit 10 sets the longer unique value of the two kinds of unique values of time as a region-dependent time (S337). The process then returns. On the other hand, in step S335, if it is determined that the position of the detected touch is in the right region with respect to the center line of the screen on touch panel 101 (NO in S335), control unit 10 sets the shorter unique value of the two kinds of unique values of time as a region-dependent time (S341). The process then returns.

In step S333, if it is determined that the user is left-handed (NO in S333), control unit 10 determines whether the position of the detected touch is in the left region (region RG3) with respect to the center line of the screen on touch panel 101 (S339).

In step S339, if it is determined that the position of the detected touch is in the right region with respect to the center line of the screen on touch panel 101 (NO in S339), control unit 10 sets the longer unique value of the two kinds of unique values of time as a region-dependent time (S337). The process then returns. On the other hand, in step S339, if it is determined that the position of the detected touch is in the right region with respect to the center line of the screen on touch panel 101 (YES in S339), control unit 10 sets the shorter unique value of the two kinds of unique values of time as a region-dependent time (S341). The process then returns.

As described above, the time lag between the first touch and the second touch is likely to be larger when the user touches the lower portion of touch panel 101 than when the user touches the upper portion. In the first method of setting a region-dependent time, a wait time for determining whether a touch is multi-touch is set longer when the position of the first touch on touch panel 101 is in the lower portion than when it is in the upper portion. Accordingly, the user's multi-touch can be detected appropriately.

The time lag between a touch and a second touch of multi-touch is likely to increase as the position of a touch on touch panel 101 is farther from the end on the user's dominant hand side. In the second method of setting a region-dependent time, the farther is the first touch on touch panel 101 from the end on the dominant hand side, the longer wait time for determining whether a touch is multi-touch is set. Accordingly, the user's multi-touch can be detected appropriately.

(B-3) Third Method of Setting Region-Dependent Time

A third method of setting a region-dependent time combines the first method of setting a region-dependent time with the second method of setting a region-dependent time whereby a screen on touch panel 101 is virtually divided into a plurality of regions arranged in a matrix.

Figure 21:
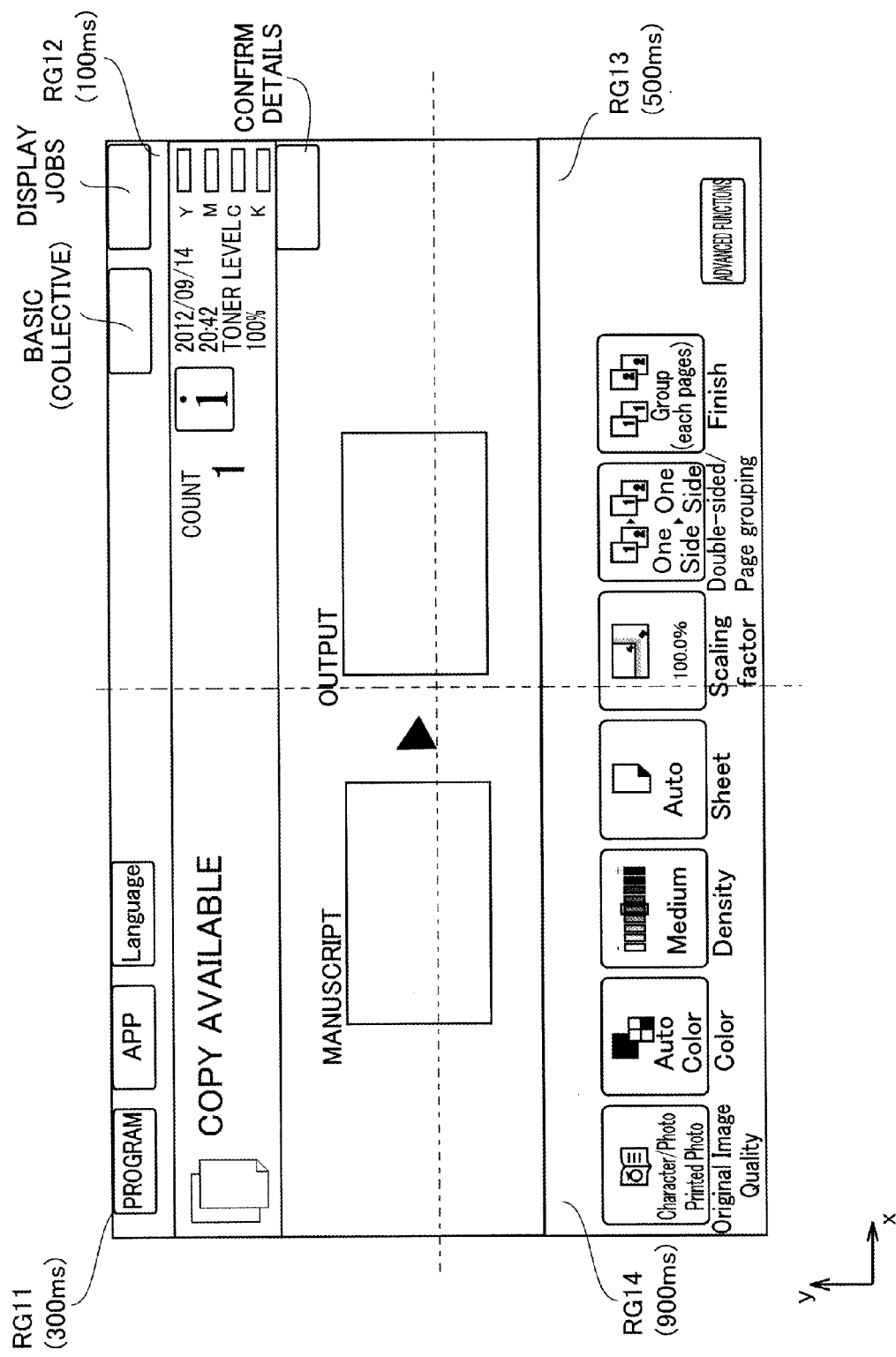
FIG. 21 is a diagram illustrating a third method of setting a region-dependent time.

FIG. 21 is a diagram illustrating the third method of setting a region-dependent time. FIG. 21 shows unique values of the regions in a case where the user is right-handed.

Referring to FIG. 21, MFP 1 virtually divides a screen on touch panel 101 into a plurality of regions arranged in a matrix and sets a unique value of time for each of the divided regions. MFP 1 sets a unique value for each of the regions such that a region in the lower portion of the screen on touch panel 101 has a larger unique value. MFP 1 obtains information of the user's dominant hand and, if the information indicates that the user is right-handed, sets a unique value for each of the regions such that a region on the left side of the screen on touch panel 101 has a larger unique value. If the information of the user's dominant hand indicates that the user is left-handed, MFP 1 sets a unique value for each of the regions such that a region on the right side of the screen on touch panel 101 has a larger unique value. MFP 1 then determines in which of the regions the position of the detected touch is included and sets the unique value set for the region determined to include the position of the touch, as a region-dependent time.

Specifically, MFP 1 virtually divides the screen of touch panel 101 into regions RG11 to RG14. Regions RG11 and RG12 are regions in the upper portion with respect to the center line of the screen (the line indicated by the chain line), and regions RG13 and RG14 are regions in the lower portion with respect to the center line of the screen. Regions RG11 and RG14 are arranged in the up-down direction on the left side with respect to the center line (the line indicated by the two-dot chain line) of the screen of touch panel 101, and regions RG12 and RG13 are arranged in the up-down direction on the right side with respect to the center line of the screen on touch panel 101. MFP 1 sets a unique value of time for each of regions RG11 to RG14 such that the unique values of regions RG13 and RG14 are larger than the unique values of regions RG11 and RG12.

In a case where the user is right-handed, MFP 1 sets a unique value of time for each of regions RG11 to RG14 such that the unique value of region RG11 is larger than the unique value of RG12 and the unique value of region RG14 is larger than the unique value of region RG13. In this case, for example, the unique value of region RG11 is set to 300 ms, the unique value of region RG12 is set to 100 ms, the unique value of region RG13 is set to 500 ms, and the unique value of region RG14 is set to 900 ms.

In a case where the user is left-handed, MFP 1 sets a unique value of time for each of regions RG11 to RG14 such that the unique value of region RG12 is larger than the unique value of RG11 and the unique value of region RG13 is larger than the unique value of region RG14. In this case, for example, the unique value of region RG11 is set to 100 ms, the unique value of region RG12 is set to 300 ms, the unique value of region RG13 is set to 900 ms, and the unique value of region RG14 is set to 500 ms.

MFP 1 determines in which of regions RG11 to RG14 the position of the touch is included, based on the coordinates (the x-coordinate and the y-coordinate) of the position of the detected touch and sets the unique value set for the region as a region-dependent time.

Figure 22:
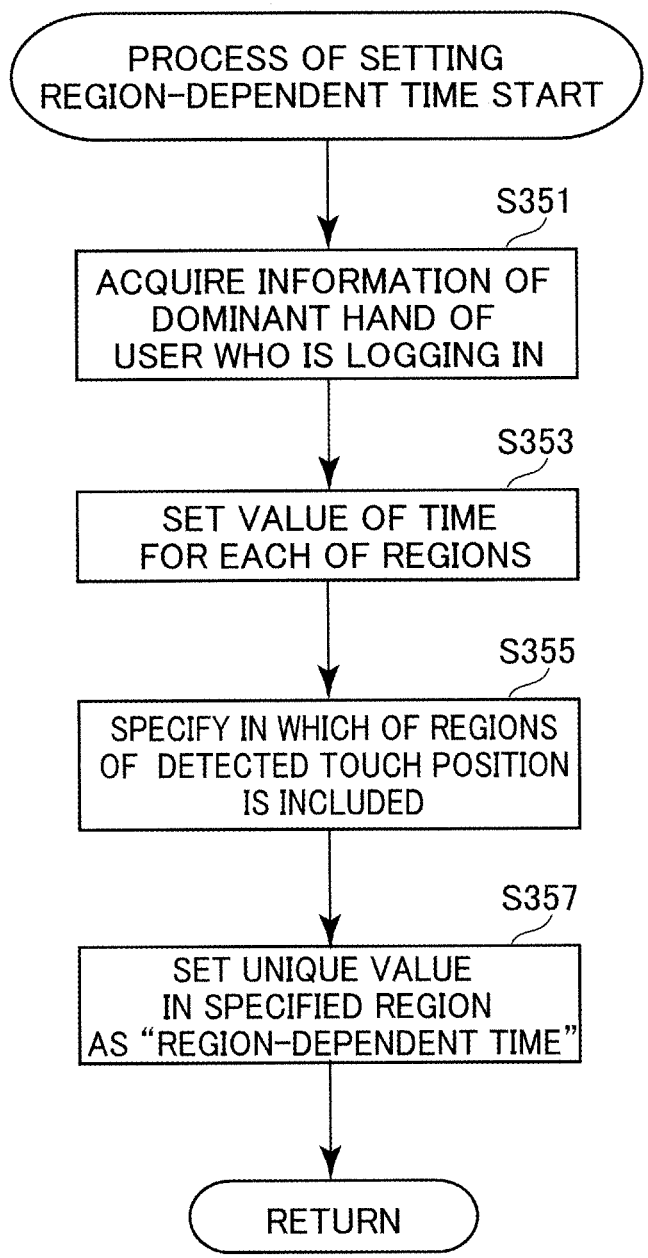
FIG. 22 shows a subroutine of the process of setting a region-dependent time in a case where the third method of setting a region-dependent time is employed.

FIG. 22 shows a subroutine of the process of setting a region-dependent time in a case where the third method of setting a region-dependent time is employed.

Referring to FIG. 22, in the process of setting a region-dependent time, control unit 10 acquires information of the dominant hand of the user who is logging in from the user information database (S351). Control unit 10 then virtually divides the screen on touch panel 101 into a plurality of regions arranged in a matrix and sets a unique value of time for each of the regions based on the acquired information (S353). Control unit 10 then specifies in which of the regions the position of the detected touch is included (S355) and sets the unique value in the specified region as a region-dependent time (S357). The process then returns.

(B-4) Fourth Method of Setting Region-Dependent Time

Figure 23:
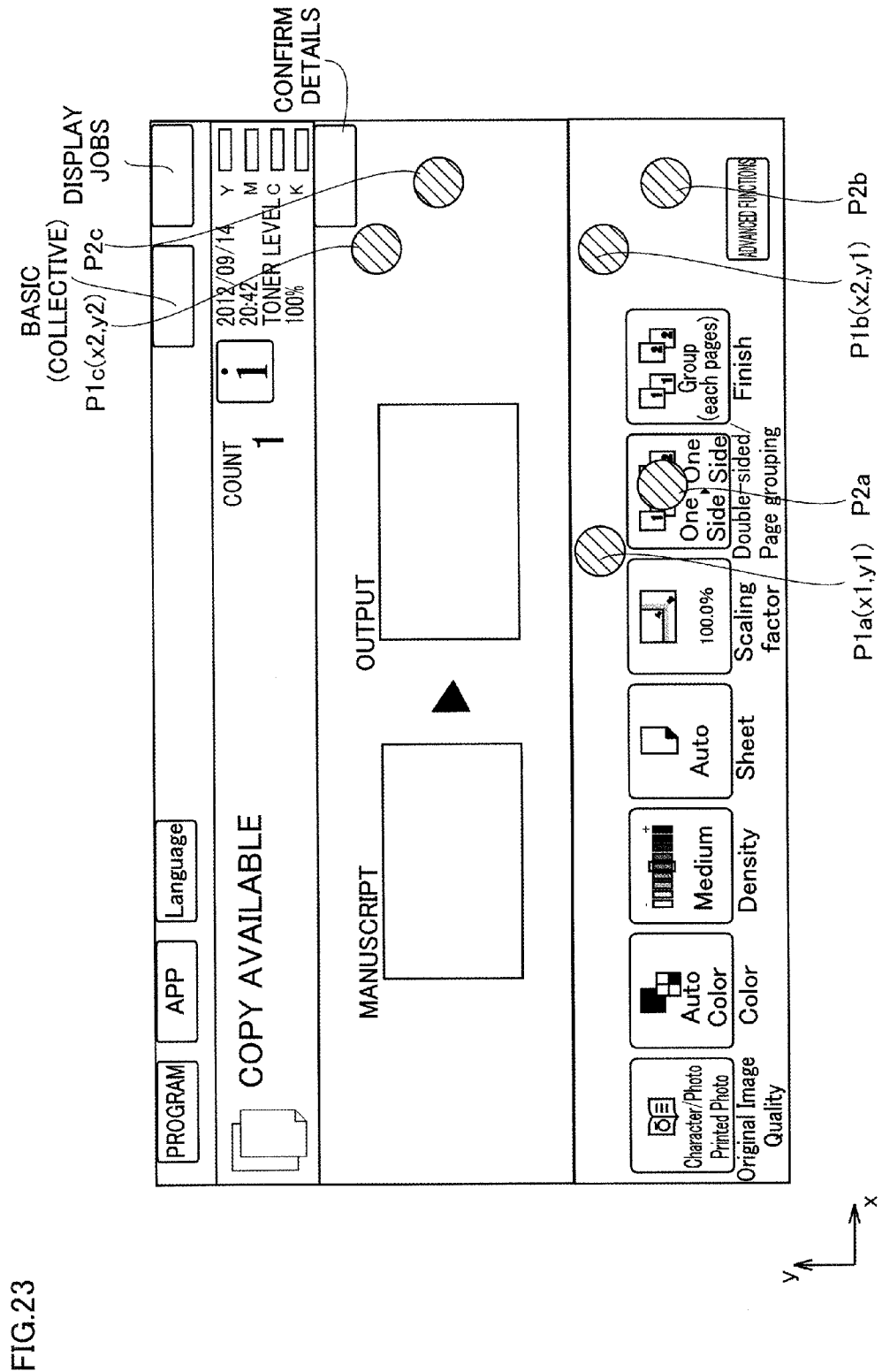
FIG. 23 is a diagram illustrating a fourth method of setting a region-dependent time.

FIG. 23 is a diagram illustrating a fourth method of setting a region-dependent time.

Referring to FIG. 23, MFP 1 sets a unique value of time for each coordinate of touch panel 101. MFP 1 sets a unique value for each coordinate such that a region in the lower portion of the screen on touch panel 101 (with a smaller value of the y-coordinate) has a larger unique value. MFP 1 also acquires information of the user's dominant hand and, if the information indicates that the user is right-handed, sets a unique value for each coordinate such that a region on the left side of the screen on touch panel 101 (with a smaller value of the x-coordinate) has a larger unique value. If the information of the user's dominant hand indicates that the user is left-handed, MFP 1 sets a unique value for each coordinate such that a region on the right side of the screen on touch panel 101 (with a larger value of the x-coordinate) has a larger unique value. MFP 1 then sets the unique value set for the coordinate of the position of the detected touch, as a region-dependent time.

Here, it is assumed that x1>x2, and y1>y2. In a case where the user is right-handed, when the position of the detected touch is position P1$a$ at the coordinates (x1, y1), MFP 1 sets a region-dependent time longer than the time set when the position of the detected touch is position P1$b$ at the coordinates (x2, y1). When the position of the detected touch is position P1$b$ at the coordinates (x2, y1), MFP 1 sets a region-dependent time longer than the time set when the position of the detected touch is position P1$c$ at the coordinates (x2, y2). Positions P2$a$, P2$b$, and P1$c$ schematically show the positions of the second touch in a case where the positions of the first touch are positions P1$a$, P1$b$, and P1$c$, respectively.

The subroutine of the process of setting a region-dependent time in a case where the fourth method of setting a region-dependent time is employed is the same as the subroutine shown in FIG. 22 and a description thereof will not be repeated.

(C) Method of Setting Environment-Considered Time

Specific examples of a method of setting an environment-considered time will be described one by one.

(C-1) First Method of Setting Environment-Considered Time

In a first method of setting an environment-considered time, MFP 1 detects the inclination angle of the display surface of touch panel 101 and sets an environment-considered time such that the closer is the inclination angle to the angle indicating that the display surface of touch panel 101 is vertical, the longer is the environment-considered time.

Figure 24:
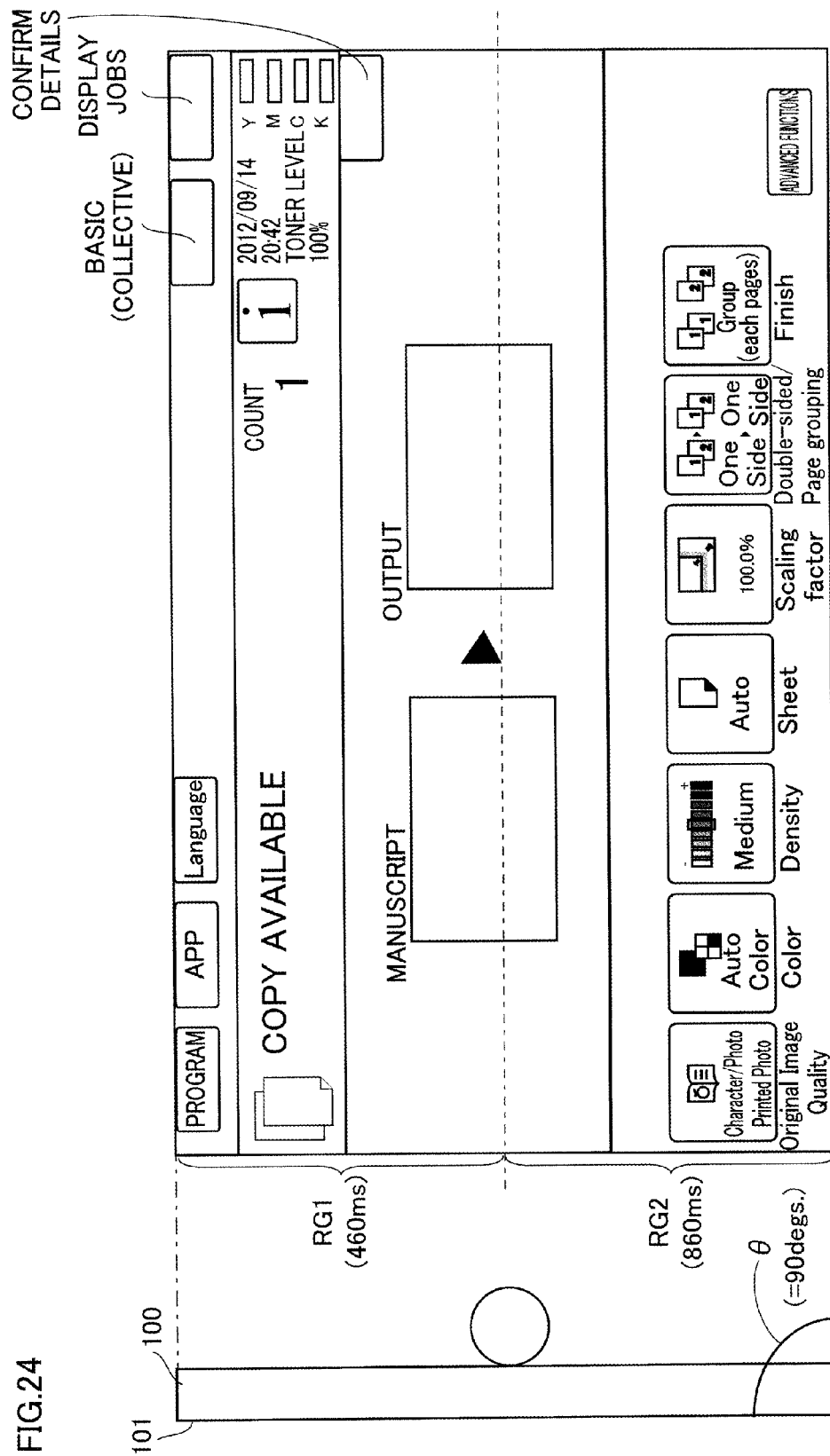
FIG. 24 is a diagram illustrating a first method of setting an environment-considered time and showing that the angle θ of the display surface of touch panel 101 relative to the horizontal plane is 90 degrees.
Figure 25:
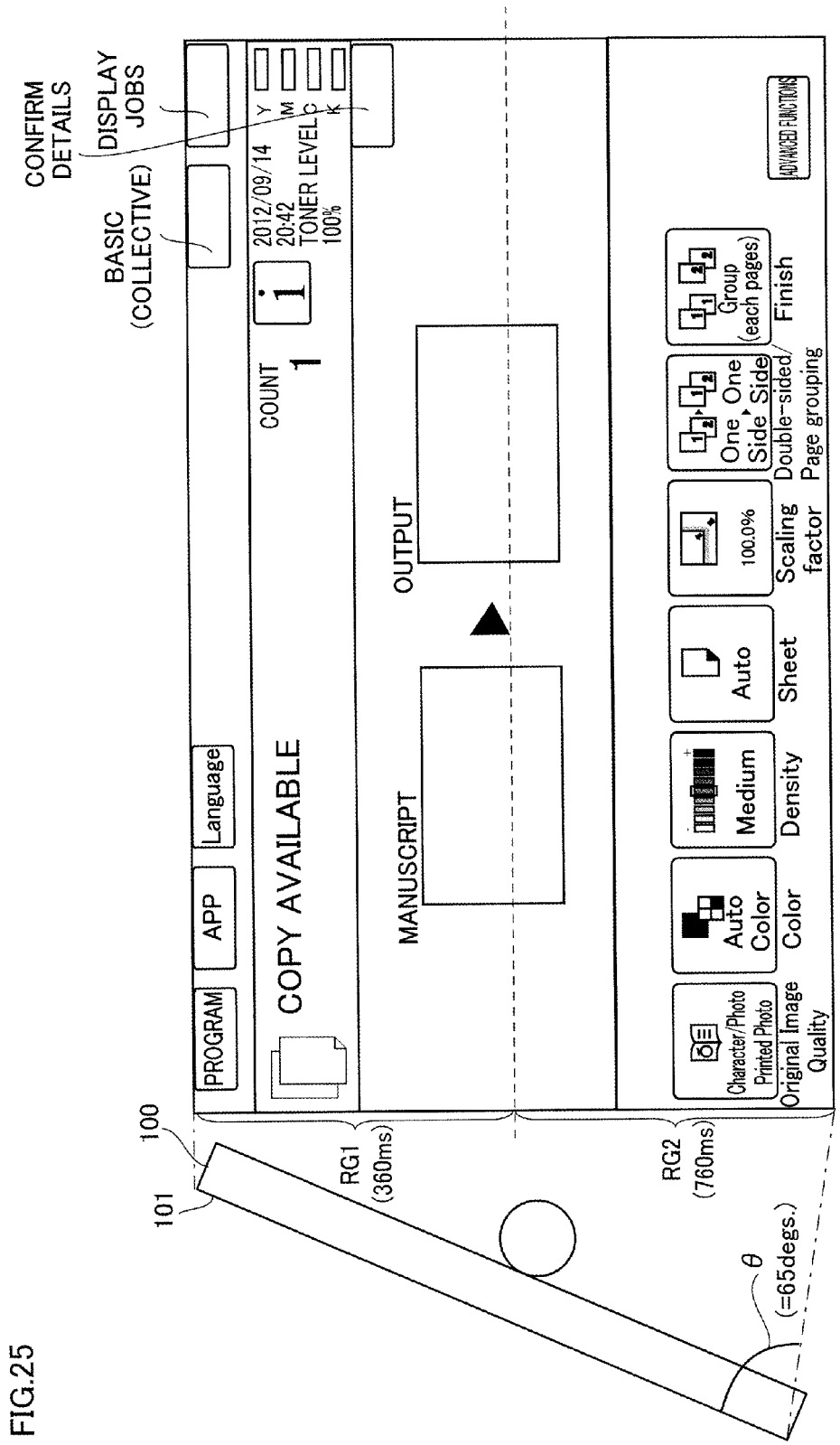
FIG. 25 is a diagram illustrating the first method of setting an environment-considered time and showing that the angle θ of the display surface of touch panel 101 relative to the horizontal plane is 65 degrees.

FIG. 24 and FIG. 25 are diagrams illustrating the first method of setting an environment-considered time. FIG. 24 shows that the angle θ of the display surface of touch panel 101 relative to the horizontal plane is 90 degrees. FIG. 25 shows that the angle θ of the display surface of touch panel 101 relative to the horizontal plane is 65 degrees. The display surface of touch panel 101 in the state shown in FIG. 24 is closer to the vertical than in the state shown in FIG. 25. In FIG. 24 and FIG. 25, the screen on touch panel 101 is virtually divided into region RG1 (the unique value of the region-dependent time is 100 ms) and region RG2 (the unique value of the region-dependent time is 500 ms). The angle θ is the angle of the display surface of touch panel 101 relative to the horizontal plane.

The environment-considered time is calculated, for example, from the product of the angle θ and a positive coefficient α. As shown in FIG. 24, in the state in which the display surface of touch panel 101 is vertical, the environment-considered time is longer and the wait time is also longer. Specifically, when the coefficient α is 4 (ms/degree), the environment-considered time is 90 (degrees)×4 (ms/degree)=360 ms. The resulting wait time in a case where the position of a touch on touch panel 101 is included in region RG1 is 100 ms+360 ms=460 ms, and the resulting wait time in a case where the position of a touch on touch panel 101 is included in region RG2 is 500 ms+360 ms=860 ms.

As shown in FIG. 25, in the state in which the display surface of touch panel 101 is closer to the horizon (a state in which operation panel 100 is tilted), the environment-considered time is shorter and the wait time is also shorter when compared with the state in which the display surface of touch panel 101 is vertical. Specifically, when the coefficient α is 4 (ms/degree), the environment-considered time is 65 (degrees)×4 (ms/degree)=260 ms. The resulting wait time in a case where the position of a touch on touch panel 101 is included in region RG1 is 100 ms+260 ms=360 ms, and the resulting wait time in a case where the position of a touch on touch panel 101 is included in region RG2 is 500 ms+260 ms=760 ms.

Figure 26:
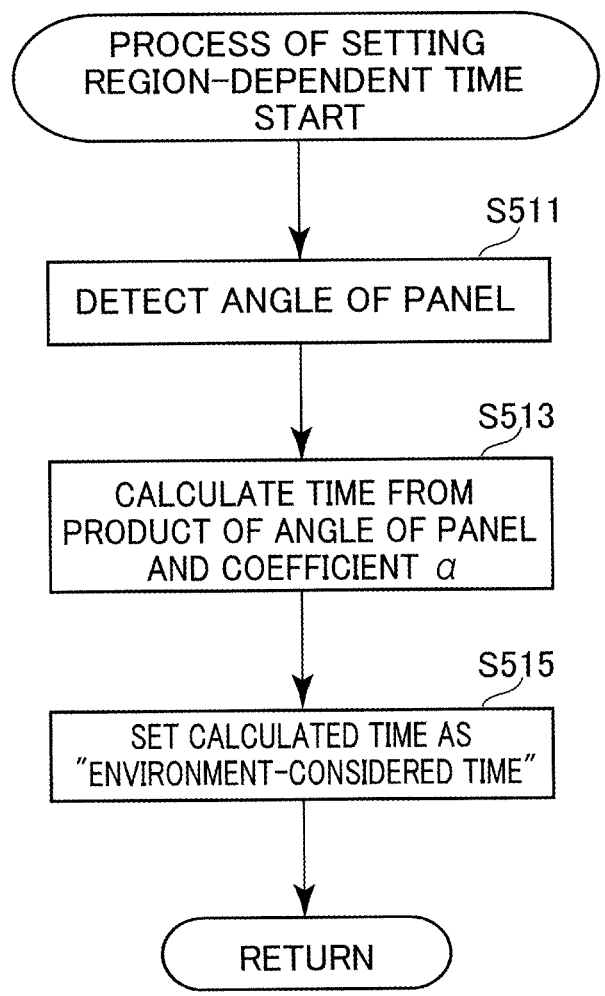
FIG. 26 shows a subroutine of the process of setting a region-dependent time in a case where the first method of setting an environment-considered time is employed.

FIG. 26 shows a subroutine of the process of setting a region-dependent time in a case where the first method of setting an environment-considered time is employed. The subroutines shown in FIG. 26 and FIG. 29 below are subroutines of the process of setting a region-dependent time shown in step S201 in FIG. 10.

Referring to FIG. 26, in the subroutine of the process of setting a region-dependent time, control unit 10 detects the angle θ (the angle of the panel) of the display surface of touch panel 101 (S511). Control unit 10 then calculates the time from the product of the angle θ and the coefficient α (S513) and sets the calculated time as an environment-considered time (S515). The process then ends.

As explained with reference to FIG. 11, the time lag between the first touch and the second touch is likely to increase as the display surface of touch panel 101 is closer to the vertical. In the first method of setting an environment-considered time, the closer is the display surface of touch panel 101 to the vertical, the longer wait time for determining whether a touch is multi-touch is set. Accordingly, the user's multi-touch can be detected appropriately.

In the first method of setting an environment-considered time, the environment-considered time may be set by a method other than calculation from the product as described above as long as it is set based on the inclination angle of operation panel 100. For example, a table may be stored in advance, for example, in storage unit 24, in which the inclination angle of operation panel 100 is associated with the environment-considered time, and the environment-considered time may be set by referring to this table.

(C-2) Second Method of Setting Environment-Considered Time

In a second method of setting an environment-considered time, MFP 1 acquires the height of the user and sets an environment-considered time such that the taller is the user, the longer is the wait time.

Figure 27:
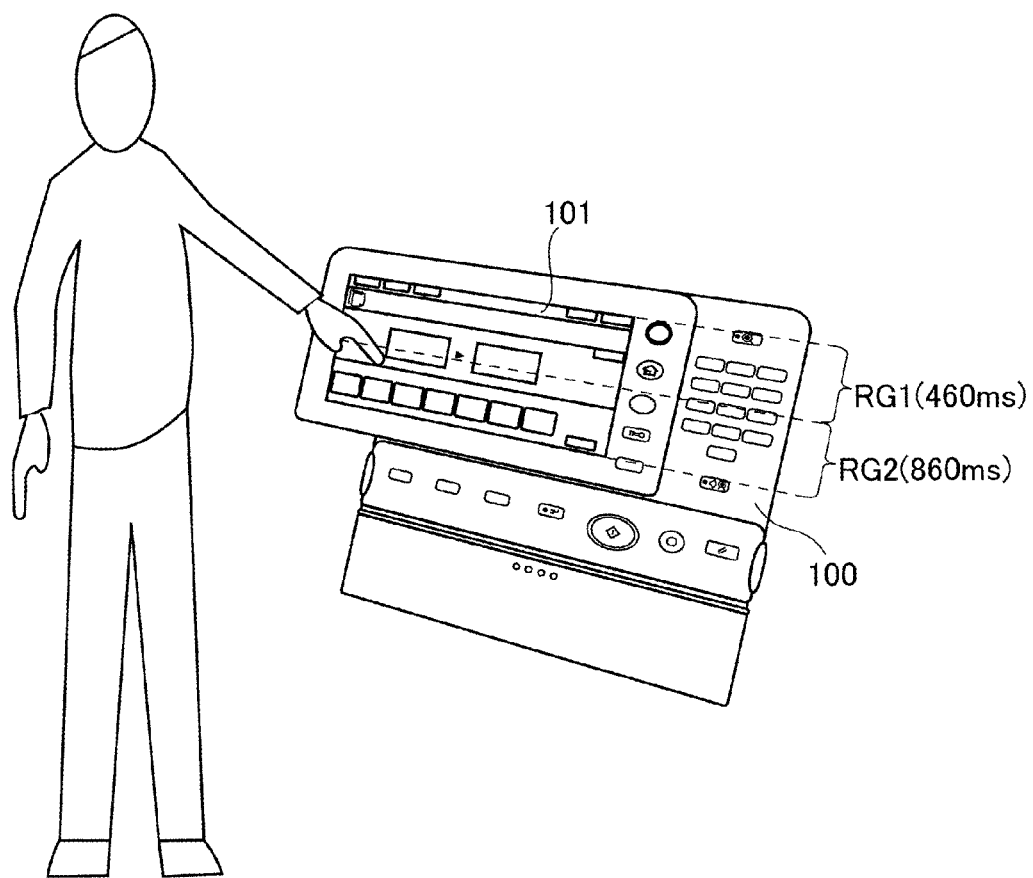
FIG. 27 is a diagram illustrating a second method of setting an environment-considered time and showing a case where a user who operates operation panel 100 is tall.
Figure 28:
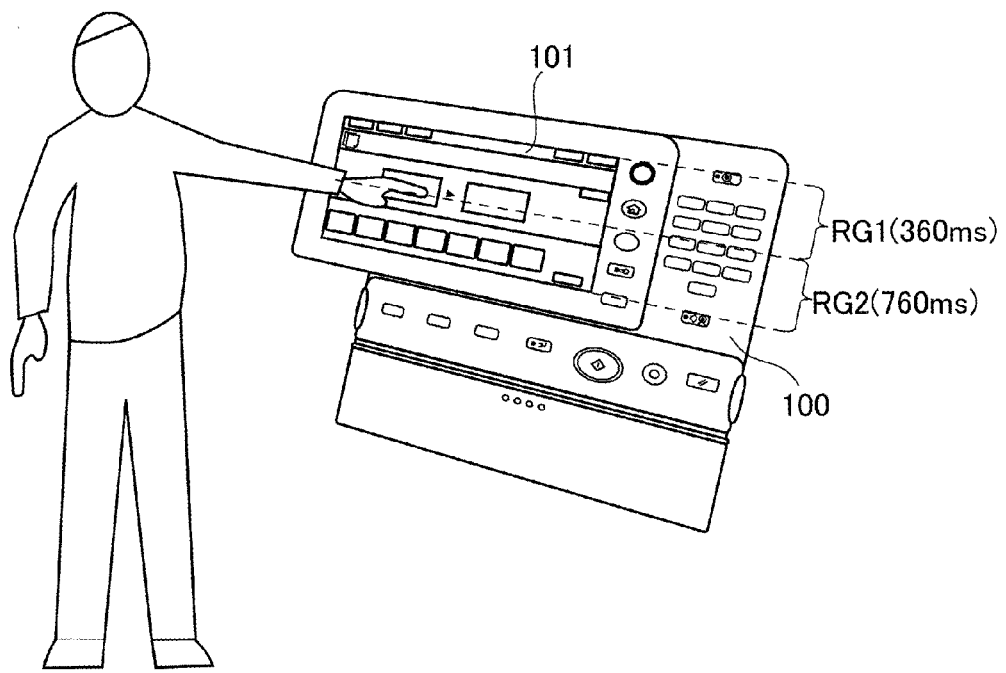
FIG. 28 is a diagram illustrating the second method of setting an environment-considered time and showing a case where a user who operates operation panel 100 is short.

FIG. 27 and FIG. 28 are diagrams illustrating the second method of setting an environment-considered time. FIG. 27 shows a case where a user who operates operation panel 100 is tall and FIG. 28 shows a case where a user who operates operation panel 100 is short. In FIG. 27 and FIG. 28, the screen on touch panel 101 is virtually divided into region RG1 (the unique value is 100 ms) and region RG2 (the unique value is 500 ms).

The environment-considered time is calculated, for example, from the product of the user's height and a positive coefficient β. As shown in FIG. 27, when a user who operates operation panel 100 is tall (for example, the user is 180 cm in height), the environment-considered time is longer and the wait time is also longer. Specifically, when the coefficient β is 2 (ms/cm), the environment-considered time is 180 (cm)×2 (ms/cm)=360 ms. The resulting wait time in a case where the position of a touch on touch panel 101 is included in region RG1 is 100 ms+360 ms=460 ms, and the resulting wait time in a case where the position of a touch on touch panel 101 is included in region RG2 is 500 ms+360 ms=860 ms.

As shown in FIG. 28, when a user who operates operation panel 100 is short (for example, the user is 130 cm in height), the environment-considered time is shorter and the wait time is also shorter. Specifically, when the coefficient β is 2 (ms/cm), the environment-considered time is 130 (cm)×2 (ms/cm)=260 ms. The resulting wait time in a case where the position of a touch on touch panel 101 is included in region RG1 is 100 ms+260 ms=360 ms, and the resulting wait time in a case where the position of a touch on touch panel 101 is included in region RG2 is 500 ms+260 ms=760 ms.

The user's height can be acquired by any method. An example of the method of acquiring the user's height includes storing a user information database including the user's height, for example, in storage unit 24 in advance and acquiring the user's height from the user information database. This method is generally the same as the method of acquiring information of the user's dominant hand as explained with reference to FIG. 16 to FIG. 18 and a description thereof will not be repeated. Another method includes specifying the user's height based on the operation performed on touch panel 101. Specifically, a message such as "Enter the height" appears on touch panel 101 to prompt the user to input the height, for example, using a ten-key pad of operation panel 100.

Figure 29:
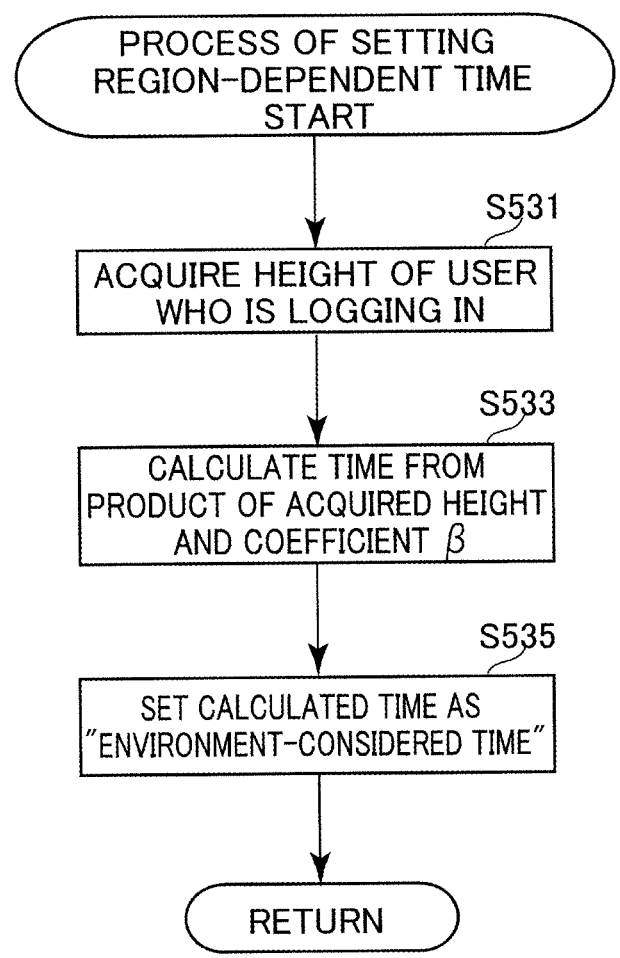
FIG. 29 shows a subroutine of the process of setting a region-dependent time in a case where the second method of setting an environment-considered time is employed.
Figure 31:
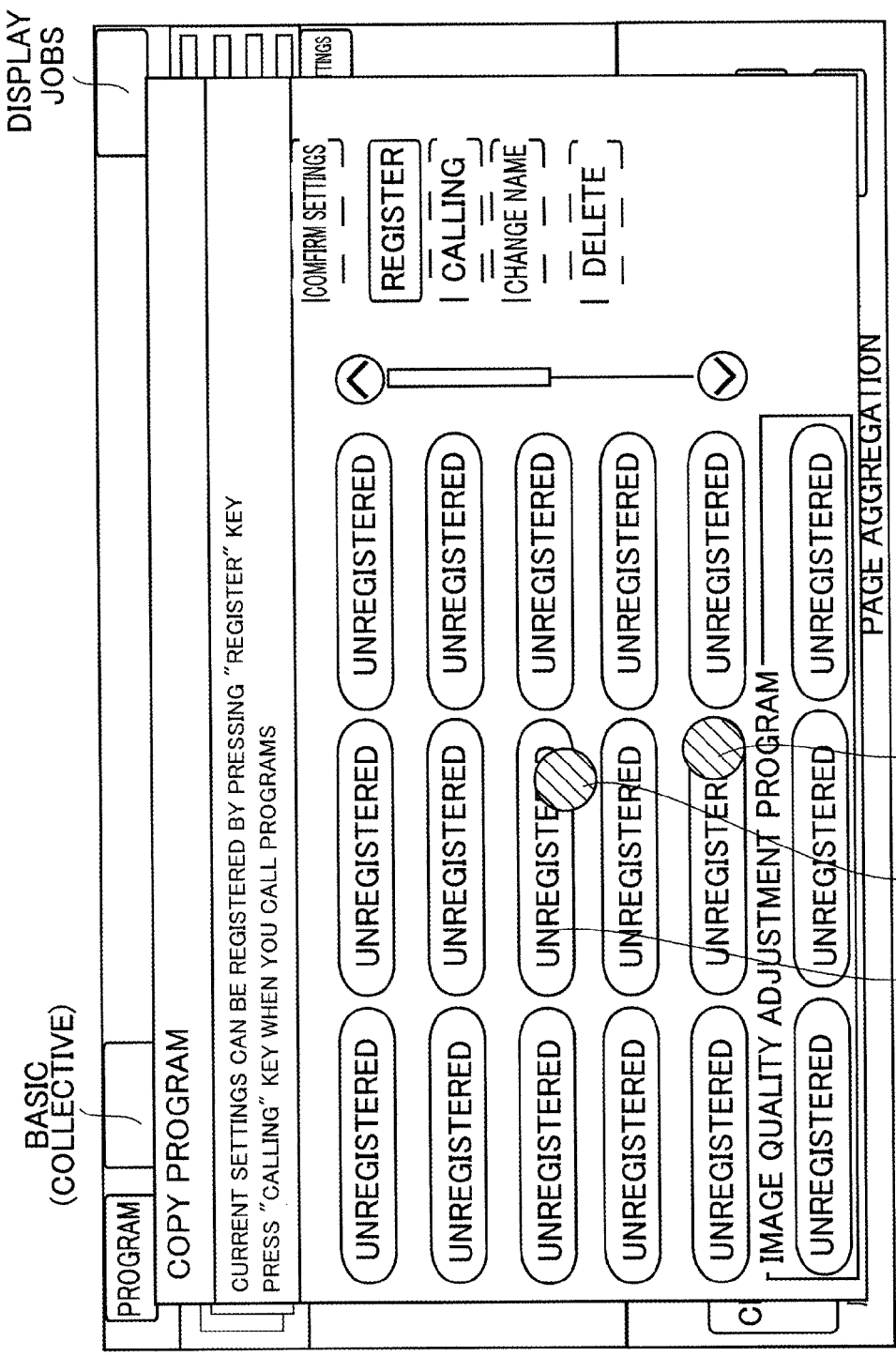
FIG. 31 is a diagram illustrating a touch determination method in a conventional information processing apparatus.

FIG. 29 shows a subroutine of the process of setting a region-dependent time in a case where the second method of setting an environment-considered time is employed.

Referring to FIG. 29, in the subroutine of the process of setting a region-dependent time, control unit 10 acquires the height of the user of MFP 1 (S531). Control unit 10 then calculates the time from the product of the acquired height and the coefficient β (S533) and sets the calculated time as an environment-considered time (S535). The process then ends.

In the second method of setting an environment-considered time, the environment-considered time may be set by a method other than calculation from the product as described above as long as it is set based on the user's height. For example, a table may be stored in advance, for example, in storage unit 24, in which the height is associated with the environment-considered time, and the environment-considered time may be set by referring to this table.

(C-3) Third Method of Setting Environment-Considered Time

A third method of setting an environment-considered time combines the first method of setting an environment-considered time with the second method of setting an environment-considered time. MFP 1 acquires the inclination angle (angle θ) of the display surface of touch panel 101 and the user's height and sets an environment-considered time based on them. In this case, MFP 1 may store a table for setting an environment-considered time as shown in FIG. 30, for example, in storage unit 24 in advance, and set an environment-considered time by referring to this table. MFP 1 may calculate an environment-considered time by performing an operation using the time obtained by the first method of setting an environment-considered time and the time obtained by the second method.

Effects of Embodiments

The present embodiment provides a display device capable of appropriately detecting a touch operation by a user.

According to the present embodiment, the wait time for determining whether a touch is multi-touch is set in accordance with the position of a first touch, so that the wait time can be set in accordance with the degree of the time lag produced between the first touch and the second touch of multi-touch. This eliminates an error determination that the first touch of multi-touch is single touch and prevents poor responsiveness due to too long a wait time. As a result, the user's touch operation can be detected appropriately.

When a first touch is detected, the timer for measuring the wait time is started, and whether a touch is multi-touch or single touch is determined based on whether a second touch is detected before the measurement time of the timer has reached the wait time. Accordingly, whether the wait time has passed can be determined easily.

Whether to start the timer is determined based on whether a key is displayed at the position of the first touch, whether a character smaller than a predetermined size is present within a predetermined distance from the position of the first touch, or whether a screen that includes at least one of a preview image and a thumbnail image appears on the display unit when a first touch is detected. Accordingly, the timer can be started only when the determination of multi-touch or single touch is required.

The wait time for determining whether a touch is multi-touch is set considering the degree of the time lag produced between the first touch and the second touch, for example, such as the user's dominant hand, the inclination angle of the operation panel, and the user's height. Accordingly, an appropriate wait time can be set.

In particular, the operation panel of an MFP is generally fixed to the body of the MFP and cannot be removed. The operation panel therefore can be adjusted in angle but cannot be adjusted in height. The operation panel is fixed at a height around the waist of the user and is located lower than the user's shoulder. It is therefore likely that when the user performs multi-touch, the index finger or the middle finger comes into contact with the touch panel prior to the thumb, unlike a portable terminal capable of changing its position. When the present embodiment is applied to the operation panel of an MFP, the user's touch operation can be detected even more appropriately.

[Others]

Any kind of multi-touch can be accepted by the MFP. In addition to pinch-out, for example, pinch-in or rotate can be accepted.

The MFP can set the wait time based on the region-dependent time and the environment-dependent time. The MFP may calculate the wait time by setting a coefficient of the environment-considered time in accordance with the use environment of the operation panel, such as the angle of the display surface of the touch panel and the user's height, and multiplying the region-dependent time by the coefficient. The MFP may set the wait time by subtracting, multiplying, or dividing the environment-considered time from/by the region-dependent time. Alternatively, the MFP may set the region-dependent time as a wait time without setting an environment-considered time.

The screen appearing on the touch panel may not be an operation screen for an image forming apparatus but may be any screen.

The forgoing embodiments can be combined as appropriate. Specifically, one of the first to third methods of determining the availability of the timer, one of the first to third methods of setting a region-dependent time, and one of the first to third methods of setting an environment-considered time can be combined together.

The processing in the foregoing embodiments may be performed either by software or by a hardware circuit. A program for executing the processing in the foregoing embodiments may be provided. A recording medium, such as a CD-ROM, a flexible-disk, a hard disk, a ROM, a RAM, or a memory card, encoded with the program may be provided to users. The program is executed by a computer such as a CPU. The program may be downloaded to the apparatus through a communication circuit such as the Internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display device comprising:
a touch detection unit that detects a touch on a display unit;
a setting unit that sets a wait time for determining whether a touch or touches on the display unit is/are single touch or multi-touch;
a multi-touch determination unit that determines that first and second touches detected by the touch detection unit are multi-touch, when the touch detection unit detects the second touch before the wait time has passed since the touch detection unit detected the first touch;
a single-touch determination unit that determines that the first touch detected by the touch detection unit is a single touch, when the wait time has passed without the touch detecting unit having detected a second touch since the first touch was detected, and
wherein the setting unit changes the wait time in accordance with a position of the detected first touch in a region on the display unit where both single touch and multi-touch operations are accepted.

2. The display device according to claim 1, further comprising a start unit that starts a timer for measuring the wait time if the touch detection unit detects the first touch, wherein
if the touch detection unit detects a second touch before a measurement time of the timer has reached the wait time since the touch detection unit detected the first touch, the multi-touch determination unit determines that the first and second touches detected by the touch detection unit are multi-touch, and
if a measurement time of the timer has reached the wait time without the touch detection unit having detected a second touch, the single-touch determination unit determines that the first touch detected by the detection unit is single touch.

3. The display device according to claim 2, further comprising a key determination unit that determines whether a key is displayed at a position of the first touch detected by the touch detection unit, wherein
if the key determination unit determines that a key is displayed, the start unit starts the timer.

4. The display device according to claim 2, further comprising a character determination unit that determines whether a character smaller than a predetermined size is present within a predetermined distance from a position of the first touch detected by the touch detection unit, wherein
if the character determination unit determines that a character smaller than a predetermined size is present, the start unit starts the timer.

5. The display device according to claim 2, further comprising an image determination unit that, if the touch detection unit detects the first touch, determines whether a screen that includes at least one of a preview image and a thumbnail image appears on the display unit, wherein
if the image determination unit determines that the screen that includes at least one of a preview image and a thumbnail image appears, the start unit starts the timer.

6. The display device according to claim 1, further comprising:
a unique value setting unit that sets a unique value for each of a plurality of regions obtained by virtually dividing a screen on the display unit; and
a region determination unit that determines in which of the plurality of regions a position of the first touch detected by the touch detection unit is included, wherein
the setting unit sets the wait time based on the unique value of a region that is determined to include the position of the first touch by the region determination unit.

7. The display device according to claim 6, wherein
the plurality of regions are arranged in an up-down direction of the display unit, and
the unique value setting unit sets the unique value for each of the plurality of regions such that a region in a lower portion of the display unit has a larger unique value.

8. The display device according to claim 6, further comprising a dominant hand acquisition unit that acquires information of dominant hand of a user, wherein
the plurality of regions are arranged in a lateral direction of the display unit,
if the information of dominant hand that is acquired by the dominant hand acquisition unit indicates that the user is right-handed, the unique value setting unit sets the unique value for each of the plurality of regions such that a region on a left side of the display unit has a larger unique value, and
if the information of dominant hand that is acquired by the dominant hand acquisition unit indicates that the user is left-handed, the unique value setting unit sets the unique value for each of the plurality of regions such that a region on a right side of the display unit has a larger unique value.

9. The display device according to claim 8, further comprising a first user information storage unit that stores user information including the information of dominant hand, wherein
the dominant hand acquisition unit acquires the information of dominant hand from the user information stored by the first user information storage unit.

10. The display device according to claim 1, further comprising an inclination angle detection unit that detects an inclination angle of a display surface of the display unit, wherein
the setting unit sets the wait time such that the wait time increases as the inclination angle detected by the inclination angle detection unit is closer to an angle indicating the display surface of the display unit is vertical.

11. The display device according to claim 1, further comprising a height acquisition unit that acquires a user's height, wherein
the setting unit sets the wait time such that the wait time increases as the height acquired by the height acquisition unit is taller.

12. The display device according to claim 11, further comprising a second user information storage unit that stores user information including the user's height, wherein
the height acquisition unit acquires the user's height from the user information stored by the second user information storage unit.

13. The display device according to claim 1, wherein the touch detection unit detects a touch based on on-edge which is a change from a state in which the display unit is not touched to a state in which the display unit is touched.

14. The display device according to claim 1, further comprising:
an enlarged/reduced display unit that, if a preview image appears on the display unit and if the multi-touch determination unit determines that the first and second touches detected by the touch detection unit are multi-touch, displays the preview image in an enlarged or reduced size; and
an image forming unit that forms an image corresponding to an image enlarged or reduced by the enlarged/reduced display unit on a recording medium.

15. A method of controlling a display device, comprising:
detecting a first touch on a display unit;
setting a wait time for determining whether a touch or touches on the display unit is/are single touch or multi-touch;
detecting a second touch on the display unit after detecting the first touch;
determining that the detected first and second touches are multi-touch when the second touch is detected before the wait time has passed since the first touch is detected; and
determining that the detected first touch is a single touch when the wait time has passed without detecting the second touch since the first touch is detected,
wherein the wait time is changed in accordance with a position of the detected first touch in a region on the display unit where both single touch and multi-touch operations are accepted.

16. A non-transitory computer-readable recording medium encoded with a control program for a display device, the control program causing a computer to execute processing comprising:
detecting a first touch on a display unit;
setting a wait time for determining whether a touch or touches on the display unit is/are single touch or multi-touch;
detecting a second touch on the display unit after detecting the first touch;
determining that the detected first and second touches are multi-touch when the second touch is detected before the wait time has passed since the first touch is detected; and
determining that the detected first touch is a single touch when the wait time has passed without detecting the second touch since the first touch is detected,
wherein the wait time is changed in accordance with a position of the detected first touch in a region on the display unit where both single touch and multi-touch operations are accepted.

17. A display device comprising:
a touch detection unit that detects a touch on a display unit;
a hardware processor configured to:
determine that an operation performed by a user is multi-touch when, before a wait time for determining whether a touch or touches on the display unit is/are single touch or multi-touch has passed since a first touch is detected by the touch detection unit, a second touch is detected by the touch detection unit;
determine that the operation performed by the user is a single touch when the wait time has passed without the touch detecting unit having detected a second touch since the first touch was detected;
wherein the wait time is changed in accordance with a position of the detected first touch in a region on the display unit where both single touch and multi-touch operations are accepted.

18. The display device according to claim 2, wherein the start unit starts the timer when the position of the detected first touch detected is a region having a high possibility of accepting a pinch gesture.

* * * * *